(12) United States Patent
Tabata et al.

(10) Patent No.: US 12,122,241 B2
(45) Date of Patent: Oct. 22, 2024

(54) DRIVING APPARATUS FOR VEHICLE

(71) Applicant: TOYOTA JIDOSHA KABUSHIKI KAISHA, Toyota (JP)

(72) Inventors: Atsushi Tabata, Okazaki (JP); Koichi Okuda, Toyota (JP); Koji Takaira, Okazaki (JP); Yuuki Makino, Aichi-gun (JP); Akinori Homan, Toyota (JP); Yosuke Akiyama, Toyota (JP); Akira Ijichi, Odawara (JP); Kunihiko Usui, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 233 days.

(21) Appl. No.: 17/804,197

(22) Filed: May 26, 2022

(65) Prior Publication Data

US 2022/0388493 A1 Dec. 8, 2022

(30) Foreign Application Priority Data

Jun. 4, 2021 (JP) ................................. 2021-094771

(51) Int. Cl.
*B60K 6/52* (2007.10)
*B60W 10/06* (2006.01)
(Continued)

(52) U.S. Cl.
CPC ............... *B60K 6/52* (2013.01); *B60W 10/06* (2013.01); *B60W 10/08* (2013.01);
(Continued)

(58) Field of Classification Search
CPC ........ B60K 6/52; B60K 17/344; B60K 6/365; B60K 23/0808; B60W 10/06;
(Continued)

(56) References Cited

U.S. PATENT DOCUMENTS 5,988,307 A * 11/1999 Yamada ............... B60K 17/356
903/906
2013/0231809 A1* 9/2013 Mamiya ............... B60W 20/20
180/65.265

(Continued)

FOREIGN PATENT DOCUMENTS

| JP | 2007-246056 A | | 9/2007 | |
|---|---|---|---|---|
| JP | 2007246056 | * | 9/2007 | ............. Y02T 10/62 |
| WO | WO2014020992 | * | 2/2014 | ............... B60K 6/40 |

OTHER PUBLICATIONS

WO2014020992 translation (Year: 2014).*

*Primary Examiner* — Joan T Goodbody
(74) *Attorney, Agent, or Firm* — Oblon, McClelland, Maier & Neustadt, L.L.P.

(57) ABSTRACT

A vehicle driving apparatus includes: an engine; a first rotary electric machine; first and second output shafts; a power distribution device for distributing a power between the first and second output shafts; and a control device for controlling an electric-power generation torque of a second rotary electric machine such that a power distribution ratio between the first and second output shafts becomes a target distribution ratio, and controlling a total torque of the engine and the first rotary electric machine such that a requested drive torque is obtained. The control device executes an electric-power consuming control to supply at least a part of a generated electric power generated by the second rotary electric machine, to the first rotary electric machine without via a power storage device, and to drive the first rotary electric machine, such that an operation state of the engine is brought close to a fuel-economy optimum state.

4 Claims, 7 Drawing Sheets

(51) Int. Cl.
*B60W 10/08* (2006.01)
*B60W 10/119* (2012.01)
*B60W 20/13* (2016.01)
*B60W 20/15* (2016.01)

(52) U.S. Cl.
CPC .......... *B60W 10/119* (2013.01); *B60W 20/13* (2016.01); *B60W 20/15* (2016.01); *B60W 2510/244* (2013.01)

(58) Field of Classification Search
CPC .... B60W 10/08; B60W 10/119; B60W 20/13; B60W 20/15; B60W 10/14; F16H 48/36
See application file for complete search history.

(56) References Cited

U.S. PATENT DOCUMENTS

| | | | |
|---|---|---|---|
| 2015/0006004 A1* | 1/2015 | Yamamoto ............. | B60K 6/445 |
| | | | 903/902 |
| 2018/0170345 A1* | 6/2018 | Katsumata ............. | B60K 6/365 |
| 2019/0084404 A1* | 3/2019 | Imai ..................... | B60W 10/115 |
| 2019/0176609 A1* | 6/2019 | Bando ................... | B60K 6/365 |

* cited by examiner

| AT GEAR POSITION | C1 | C2 | B1 | B2 | F1 |
|---|---|---|---|---|---|
| N,Rev | | | | | |
| 1st | ○ | | | △ | ○ |
| 2nd | ○ | | ○ | | |
| 3rd | ○ | ○ | | | |
| 4th | | ○ | ○ | | |

| NUMBER | MODE | BF1 | CF1 | D1 STATE | | D2 STATE | | |
|---|---|---|---|---|---|---|---|---|
| | | | | [1] | [2] | [1] | [2] | [3] |
| | | | | CONNECTION | | CONNECTION | | |
| | | | | a1-a2 | a1-a3 | N | a4-a6 | a5-a6 |
| m1 | EV (FR) HIGH | | ○ | (○) | | ○ | | |
| m2 | EV (FR) LOW | ○ | | (○) | | ○ | | |
| m3 | H4_TORQUE SPLIT | | | ○ | | | ○ | |
| m4 | H4_LSD | | ○ CONTROL | ○ | | | ○ | |
| m5 | H4_Lock | | | ○ | | | | ○ |
| m6 | L4_Lock | ○ | | | ○ | | | ○ |

DRIVING APPARATUS FOR VEHICLE

This application claims priority from Japanese Patent Application No. 2021-094771 filed on Jun. 4, 2021, the disclosure of which is herein incorporated by reference in its entirety.

FIELD OF THE INVENTION

The present invention relates to a driving apparatus for a vehicle, particularly, to techniques of improving an energy efficiency in the driving apparatus including a power source, a first output shaft configured to receive a power from the power source, a second output shaft and a power distribution device configured to distribute a part of the power received by the first output shaft, to the second output shaft.

BACKGROUND OF THE INVENTION

There is known a driving apparatus for a vehicle that includes a pair of front wheels and a pair of rear wheels, the driving apparatus including: (a) a power source including an engine and a first rotary electric machine; (b) a first output shaft configured to receive a power from the power source, and to output the power to one of the pair of front wheels and the pair of rear wheels; (c) a second output shaft configured to output the power to the other of the pair of front wheels and the pair of rear wheels; (d) a power distribution device configured to distribute a part of the power received by the first output shaft, to the second output shaft, and (e) a control device. An example of such a driving apparatus is disclosed in JP 2007-246056 A. This Japanese Patent Application Publication discloses, as the above-described power distribution device, a device including (d-1) a second rotary electric machine and (d-2) a differential device including a first rotary element connected to the second rotary electric machine, a second rotary element connected to the first output shaft and a third rotary element connected to the second output shaft, (d-3) such that the part of the power received by the first output shaft is distributed to the second output shaft, with a reaction force being applied to the first rotary element owing to a torque of the second rotary electric machine.

SUMMARY OF THE INVENTION

By the way, in a case in which the reaction force applied to the first rotary element is controlled by causing the second rotary electric machine of the power distribution device to generate an electric-power generation torque (that may be referred also to as "regenerative torque"), it is common that a generated electric power generated by the second rotary electric machine through an electric-electric-power generation control is used to charge a power storage device, and that the electric power is taken out of the power storage device, as needed, depending on a running situation of the vehicle, so as to be used for controlling a torque of the first rotary electric machine, for example. However, in the transfer of the electric power via the power storage device, an electric power loss is caused when the battery is charged and discharged, so that there is a room for improvement in the energy efficiency in the driving apparatus in its entirety.

The present invention was made in view of the background art described above. It is therefore an object of the present invention to improve the energy efficiency in the vehicle driving apparatus in its entirety where the power distribution is performed with the reaction force being applied to the differential device with use of the electric-power generation torque generated by the second rotary electric machine.

The object indicated above is achieved according to the following aspects of the present invention.

According to a first aspect of the invention, there is provided a driving apparatus for a vehicle that includes a pair of front wheels and a pair of rear wheels, the driving apparatus comprising: (a) a power source including an engine and a first rotary electric machine; (b) a first output shaft configured to receive a power from the power source, and to output the power to one of the pair of front wheels and the pair of rear wheels; (c) a second output shaft configured to output the power to the other of the pair of front wheels and the pair of rear wheels; (d) a power distribution device configured to distribute a part of the power received by the first output shaft, to the second output shaft, and (e) a control device, wherein the power distribution device includes (d-1) a second rotary electric machine, and (d-2) a differential device including a first rotary element connected to the second rotary electric machine, a second rotary element connected to the first output shaft and a third rotary element connected to the second output shaft, such that the part of the power received by the first output shaft is distributed to the second output shaft, with a reaction force being applied to the first rotary element owing to an electric-power generation torque of the second rotary electric machine, wherein the control device includes a torque-split control portion which is configured to execute an electric-power generation control for controlling the electric-power generation torque of the second rotary electric machine such that a power distribution ratio between the first and second output shafts becomes a target distribution ratio, and which is configured to control a total torque of the power source including the engine and the first rotary electric machine such that a requested drive torque is obtained irrespective of the electric-power generation torque of the second rotary electric machine, and wherein the torque-split control portion includes an electric-power-consumption control portion configured to execute an electric-power consuming control to supply at least a part of a generated electric power obtained by the electric-power generation control, to the first rotary electric machine without via a power storage device, and to drive the first rotary electric machine, such that an operation state of the engine is brought close to a fuel-economy optimum state.

According to a second aspect of the invention, in the driving apparatus according to the first aspect of the invention, the torque-split control portion includes a charge control portion configured to execute a power-storage charging control to charge the power storage device with all of the generated electric power, wherein the torque-split control portion is configured to make an engine-operation-state-dependent selection for selecting one of the power-storage charging control by the charge control portion and the electric-power consuming control by the electric-power-consumption control portion, depending on an operation state of the engine.

According to a third aspect of the invention, in the driving apparatus according to the first or second aspect of the invention, the torque-split control portion is configured to determine whether it is possible to cause the operation state of the engine to be brought close to the fuel-economy optimum state, by supplying at least the part of the generated electric power to the first rotary electric machine and driving the first rotary electric machine, wherein the torque-split control portion selects the electric-power consuming control to be executed by the electric-power-consumption control portion, when determining that it is possible to cause the operation state of the engine to be brought close to the fuel-economy optimum state by supplying at least the part of the generated electric power to the first rotary electric machine and driving the first rotary electric machine, and wherein the torque-split control portion selects the power-storage charging control to be executed by the charge control portion, when determining that it is not possible to cause the operation state of the engine to be brought close to the fuel-economy optimum state by supplying at least the part of the generated electric power to the first rotary electric machine and driving the first rotary electric machine.

According to a fourth aspect of the invention, in the driving apparatus according to the second or third aspect of the invention, the torque-split control portion is configured to determine whether a charged state value of the power storage device exceeds a predetermined a determination value or not, wherein, when determining that the charged state value of the power storage device exceeds the determination value, the torque-split control portion is configured to drive the first rotary electric machine by supplying all of the generated electric power to the first rotary electric machine without via the power storage device, without making the engine-operation-state-dependent selection depending on the operation state of the engine.

According to a fifth aspect of the invention, in the driving apparatus according to any one of the first through fourth aspects of the invention, in a case in which a part of the generated electric power remains as a surplus when it is possible to cause the operation state of the engine to be brought close to the fuel-economy optimum state by supplying at least the part of the generated electric power to the first rotary electric machine and driving the first rotary electric machine, the electric-power-consumption control portion is configured to charge the power storage device with the part of the generated electric power remaining as the surplus.

In the driving apparatus according to the invention, the control device includes the torque-split control portion which is configured to execute the electric-power generation control for controlling the electric-power generation torque of the second rotary electric machine such that the power distribution ratio between the first and second output shafts becomes the target distribution ratio, and which is configured to control the total torque of the power source such that the requested drive torque is obtained irrespective of the electric-power generation torque, and the torque-split control portion includes the electric-power-consumption control portion configured to execute the electric-power consuming control to supply at least a part of the generated electric power obtained by the electric-power generation control, to the first rotary electric machine without via the power storage device, and to drive the first rotary electric machine, such that the operation state of the engine is brought close to the fuel-economy optimum state. Therefore, as compared with an arrangement in which the generated electric power obtained through the electric-power generation control is always used to charge the power storage device, it is possible to reduce an electric power loss due to charge and discharge of the power storage device and accordingly improve an energy efficiency in the driving apparatus in its entirety. Further, the first rotary electric machine is driven with use of the generated electric power such that the operation state of the engine is brought close to the fuel-economy optimum state, whereby a fuel economy of the engine is improved, so that the improved fuel economy of the engine also contributes to the improvement of the energy efficiency in the driving apparatus in its entirety.

In the driving apparatus according to the second aspect of the invention, the torque-split control portion includes the charge control portion configured to execute the power-storage charging control to charge the power storage device with all of the generated electric power, and the torque-split control portion is configured to make the engine-operation-state-dependent selection for selecting one of the power-storage charging control by the charge control portion and the electric-power consuming control by the electric-power-consumption control portion, depending on the operation state of the engine. Owing to this arrangement, the electric-power consuming control is executed by the electric-power-consumption control portion appropriately depending on the operation state of the engine, so that the energy efficiency in the driving apparatus in its entirety can be improved by execution of the electric-power consuming control by the electric-power-consumption control portion.

In the driving apparatus according to the third aspect of the invention, the torque-split control portion determines whether it is possible to cause the operation state of the engine to be brought close to the fuel-economy optimum state, by supplying at least the part of the generated electric power to the first rotary electric machine and driving the first rotary electric machine, and the torque-split control portion selects the electric-power consuming control to be executed by the electric-power-consumption control portion, when determining that it is possible to cause the operation state of the engine to be brought close to the fuel-economy optimum state by supplying at least the part of the generated electric power to the first rotary electric machine and driving the first rotary electric machine. Owing to this arrangement, the electric-power consuming control is executed by the electric-power-consumption control portion appropriately depending on the operation state of the engine, so that the energy efficiency in the driving apparatus in its entirety can be improved by execution of the electric-power consuming control by the electric-power-consumption control portion.

In the driving apparatus according to the fourth aspect of the invention, when the charged state value of the power storage device exceeds the determination value, the torque-split control portion drives the first rotary electric machine by supplying all of the generated electric power to the first rotary electric machine without via the power storage device, without making the engine-operation-state-dependent selection depending on the operation state of the engine. Owing to this arrangement, it is possible to suppress the electric power loss due to the charge and discharge of the power storage device and full charge of the power storage device.

In the driving apparatus according to the fifth aspect of the invention, in a case in which a part of the generated electric power remains as a surplus when it is possible to cause the operation state of the engine to be brought close to the fuel-economy optimum state by supplying at least the part of the generated electric power to the first rotary electric machine and driving the first rotary electric machine, the electric-power-consumption control portion charges the power storage device with the part of the generated electric power remaining as the surplus. Owing to this arrangement in which the power storage device is charged with the surplus electric power, the operation state of the engine is reliably brought close to the fuel-economy optimum state whereby the energy efficiency in the driving apparatus in its entirety can be appropriately improved.

DETAILED DESCRIPTION OF PREFERRED EMBODIMENT

Figure 1:
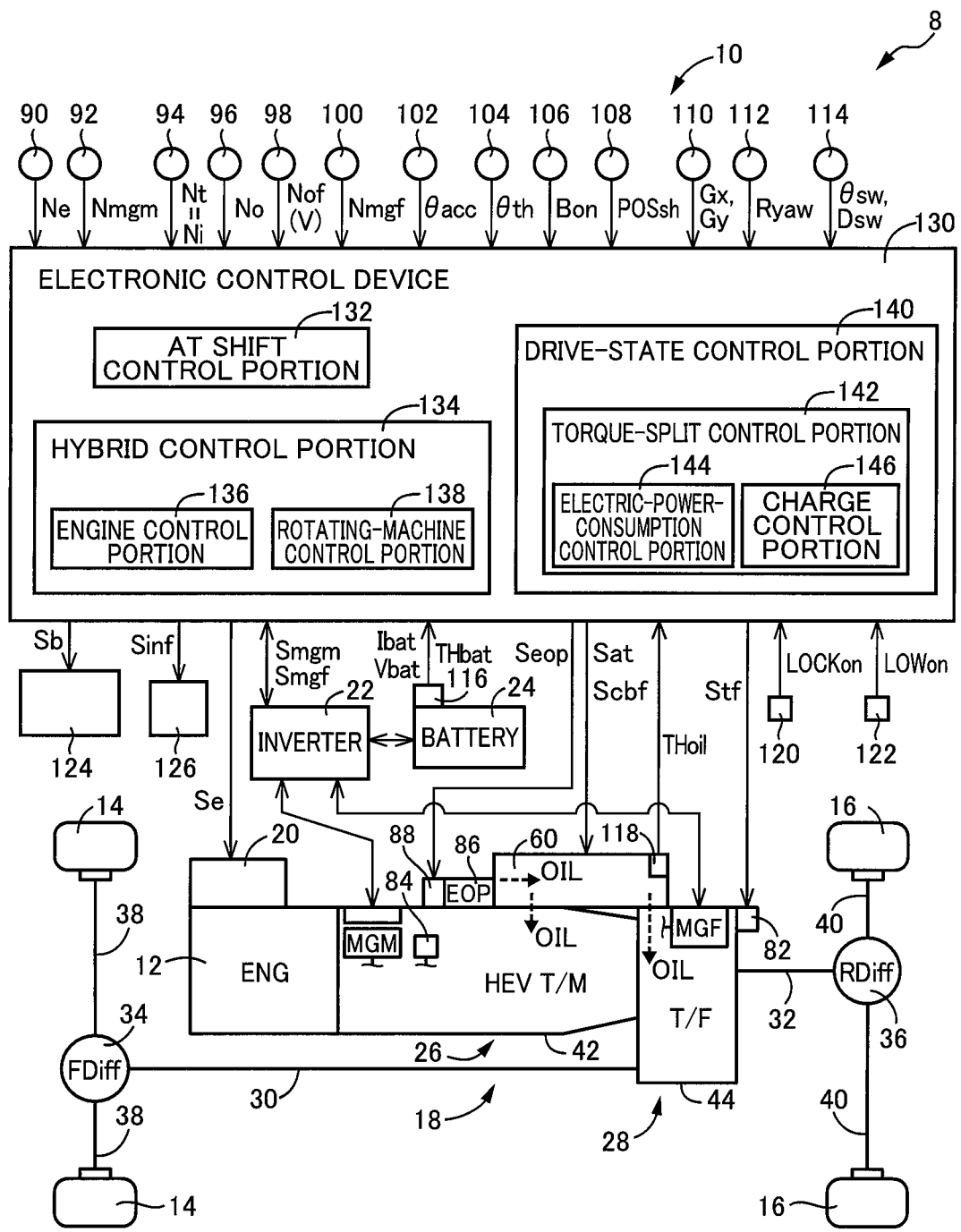
FIG. 1 is a view schematically showing a construction of a vehicle driving apparatus to which the present invention is applied, for explaining major control functions and control portions provided for performing various control operations in the vehicle driving apparatus.

The present invention is applicable to a hybrid-type front/rear-wheel-drive vehicle including a power source and a power distribution device, wherein the power source includes at least an engine and a first rotary electric machine, and the power distribution device includes a second rotary electric machine and a differential device. The engine is an internal combustion engine such as gasoline engine and diesel engine. Each of the first and second rotary electric machines is preferably a motor generator that can be used selectively as an electric motor and a generator. However, where the vehicle runs only in a torque split mode, the first rotary electric machine may be an electric motor while the second rotary electric machine may be a generator.

An operation state of the operation state of the engine can be represented by, for example, a point that is defined by a combination of an engine rotational speed and an engine torque. In that case, it is possible to determine that the engine is in a fuel-economy optimum state when the operation point lies on a fuel-economy optimum line in two-dimensional coordinates in which the engine rotational speed and the engine torque as two variables are taken along respective two axes, wherein the fuel-economy optimum line is a predetermined line on which a fuel economy of the engine is maximized. When the operation point, which is defined by a combination of the engine rotational speed (that is determined by a vehicle running speed and a gear ratio established in a power transmission path) and the engine torque (that provides a requested drive torque), is larger than the fuel-economy optimum line in terms of the engine torque, it is possible to execute the above-described electric-power consuming control by the electric-power-consumption control portion, namely, it is possible to bring the operation point close to the fuel-economy optimum line, by driving the first rotary electric machine with use of the generated electric power obtained by the above-described electric-power generation control and reducing the engine torque by a torque of the driven first rotary electric machine. On the other hand, when the operation point is not larger than the fuel-economy optimum line in terms of the engine torque, it is not possible to execute the electric-power consuming control by the electric-power-consumption control portion, because, if the first rotary electric machine is driven with use of the generated electric power obtained by the electric-power generation control, the engine torque is reduced by the torque of the driven first rotary electric machine and accordingly the operation point is moved away from the fuel-economy optimum line. It is noted that the operation state of the engine can be represented by also a throttle opening degree, an air intake amount and/or a fuel injection amount of the engine, for example.

The power distribution device is constructed, for example, such that a part of the power inputted to the first output shaft from the power source is distributed to the second output shaft (that is in a state isolated from the power source) with a reaction force being applied to the first rotary element owing to the electric-power generation torque of the second rotary electric machine, whereby the second output shaft is driven and rotated by only the distributed power. Alternatively, the power distribution device may be constructed as in the above-identified Japanese Patent Application Publication (JP 2007-246056 A), such that a center differential (center differential 10 in JP 2007-246056 A) is provided between the power source and the power distribution device (motor-torque applying mechanism 20 in JP 2007-246056 A) so as to distribute the power source transmitted from the power source, to the first and second output shafts, and such that the power distribution ratio between the first and second output shafts is adjusted to become the target distribution ratio.

The differential device constituting the power distribution device may be, for example, a single-pinion-type planetary gear device, wherein a carrier of the planetary gear device serves as the second rotary element connected to the first output shaft, and one and the other of a sun gear and a ring gear of the planetary gear device serve as the first and third rotary elements, respectively. Further, the differential device may be also a double-pinion-type planetary gear device, wherein a ring gear of the planetary gear device serves as the second rotary element connected to the first output shaft, and one and the other of a sun gear and a carrier of the planetary gear device serve as the first and third rotary elements, respectively. Still further, the power distribution device may be constituted by a plurality of planetary gear devices.

For example, the power distribution device includes: (a) a TF clutch configured to connect between selected two of the first, second and third rotary elements, so as to cause the selected two of the first, second and third rotary elements to be rotatable integrally with each other; (b) a TF brake configured to inhibit rotation of the third rotary element; (c) a first connecting/disconnecting device which is provided among a TF input shaft (to which the power of the power source is to be transmitted), the first output shat and first rotary element, and which is configured to establish selectively a first state in which the first output shaft is connected to the TF input shaft while the first rotary element is disconnected from the first output shaft and TF input shaft and a second state in which the first rotary element is connected to the TF input shaft while the first output shaft is disconnected from the first rotary element and TF input shaft; and (d) a second connecting/disconnecting device which is provided among the third rotary element, the first output shaft and the second output shaft, and which is configured to establish selectively a first state in which any one of the third rotary element, first output shaft, and second output shaft is disconnected from the others of the third rotary element, first output shaft, and second output shaft, a second state in which the second output shaft is connected to the third rotary element while the first output shaft is disconnected from the second output shaft and third rotary element, and a third state in which the first and second output shafts are connected to each other while the third rotary element is disconnected from the first and second output shafts, wherein (e) when the reaction force is applied to the first rotary element owing to the electric-power generation torque of the second rotary electric machine, with the TF clutch and TF brake being placed in non-operated states (released states), and with the first and second connecting/disconnecting devices being placed in the first and second states, respectively, a part of the power inputted to the first output shaft from the power source is distributed to the second output shaft via the third rotary element, thereby establishing the torque split mode in which the vehicle runs with the front and rear wheels being driven. The power distribution device can establish the torque split mode by only operations of the second rotary electric machine and the differential device, and may be modified, for example, such that at least one of the TF clutch, TF brake and first and second connecting/disconnecting devices may be omitted, or such that another connecting/disconnecting device such as a clutch may be additionally provided.

EMBODIMENT

Hereinafter, an embodiment of the invention will be described in detail with reference to the accompanying drawings. It is noted that the figures of the drawings are simplified or deformed as needed and portions are not necessarily precisely depicted in terms of dimension ratio, shape, etc.

FIG. 1 is a view schematically showing a construction of a vehicle driving apparatus 10 to which the present invention is applied, for explaining major control functions and control portions provided for performing various control operations in the vehicle driving apparatus 10. As shown in FIG. 1, the vehicle driving apparatus 10 includes power sources in the form of an engine 12 (that is represented by "ENG" in FIG. 1), a TM rotary electric machine MGM and a TF rotary electric machine MGF. Thus, a vehicle 8, in which the vehicle driving apparatus 10 is to be provided, is a hybrid electric vehicle having right and left front wheels (a pair of front wheels) 14 and right and left rear wheels (a pair of rear wheels) 16. The vehicle driving apparatus 10 includes a power transmission device 18 configured to transmit powers of the power sources such as the engine 12, to the front and rear wheels 14, 16. The engine 12, TM rotary electric machine MGM and TF rotary electric machine MGF serve as power sources for driving the vehicle 8. The power sources include a first power source PU1 constituted by each of the engine 12 and the TM rotary electric machine MGM that output the powers to be transmitted to a torque converter 48 and an automatic transmission 50 (that will be described below), and a second power source PU2 which is constituted by the TF rotary electric machine MGF provided in a transfer 28 (that will be described below) and which is to be used as the power source in addition to or in place of the first power source PU1. It is noted that the TM rotary electric machine MGM and the TF rotary electric machine MGF correspond to "first rotary electric machine" and "second rotary electric machine", respectively, which are recited in the appended claims.

The vehicle 8 is an all-wheel drive vehicle, i.e., a front and rear wheel drive vehicle capable of distributing a part of a torque, which is transmitted by the vehicle driving apparatus 10 to the rear wheels 16, to the front wheels 14. The vehicle driving apparatus 10 is capable of performing also a rear-wheel drive by which the torque is transmitted only to the rear wheels 16. The vehicle 8 is also a four-wheel drive vehicle having four wheels consisting of the pair of front wheels 14 and the pair of rear wheels 16. In the description of the present embodiment, an all-wheel drive (=AWD) is synonymous with a four-wheel drive (=4WD). The rear-wheel drive is a two-wheel drive (=2WD).

The engine 12 is a known internal combustion engine such as gasoline engine and diesel engine. The driving apparatus 10 is provided with an engine control device 20 that includes a throttle actuator, a fuel injection device and an ignition device. With the engine control device 20 being controlled by an electronic control device 130 that is described below, an engine torque Te, which is an output torque of the engine 12, is controlled.

Each of the TM rotary electric machine MGM and the TF rotary electric machine MGF is a rotary electric machine having a function serving as a motor, i.e., an electric motor for generating a mechanical power from an electric power and also a function serving a generator for generating an electric power from a mechanical power. That is, each of the TM rotary electric machine MGM and the TF rotary electric machine MGF is a so-called "motor generator". Each of the TM rotary electric machine MGM and the TF rotary electric machine MGF is connected to a battery 24 via an inverter 22, wherein the battery 24 and the inverter 22 are both provided in the vehicle driving apparatus 10. With the inverter 22 being controlled by the electronic control device 130 that is described below, an MGM torque Tmgm as an output torque of the TM rotary electric machine MGM and an MGF torque Tmgf as an output torque of the TF rotary electric machine MGF are controlled. Each of the MGM torque Tmgm and the MGF torque Tmgf corresponds to a power driving torque (that may be referred also to as "motor torque") when a corresponding one of the TM rotary electric machine MGM and the TF rotary electric machine MGF functions as the electric motor, and corresponds to an electric-power generation torque (that may be referred also to as "regenerative torque") when a corresponding one of the TM rotary electric machine MGM and the TF rotary electric machine MGF functions as the generator. The battery 24 is a power storage device to and from which the electric power is to be supplied from and to each of the TM rotary electric machine MGM and the TF rotary electric machine MGF. The above-described electric power corresponds to an electric energy, unless otherwise specified. Similarly, the above-described power corresponds to a drive power, a torque and a force, unless otherwise specified.

The power transmission device 18 includes a hybrid transmission 26 (see "HEV T/M" in FIG. 1), a power distribution device in the form of the transfer 28 (see "T/F" in FIG. 1), a front propeller shaft 30, a rear propeller shaft 32, a front differential device 34 (see "FDiff" in FIG. 1), a rear differential device 36 (see "RDiff" in FIG. 1), right and left front drive shafts 38 and right and left rear drive shafts 40. In the power transmission device 18, the power is transmitted from the first power source PU1 to the transfer 28 via the hybrid transmission 26, and then is transmitted from the transfer 28 to the rear wheels 16 sequentially via the rear propeller shaft 32, rear differential device 36 and rear drive shafts 40, for example. Further, in the power transmission device 18, when a part of the power transmitted from the first power source PU1 to the transfer 28 is to be distributed to the front wheels 14, the part of the power is transmitted to the front wheels 14 sequentially via the front propeller shaft 30, front differential device 34 and front drive shafts 38, for example.

The hybrid transmission 26 includes a non-rotary member in the form of a transmission case 42. The transfer 28 includes a non-rotary member in the form of a transfer case 44 that is connected to the transmission case 42. The TM rotary electric machine MGM is disposed inside the transmission case 42. The TF rotary electric machine MGF is disposed inside the transfer case 44.

Figures 2, 3:
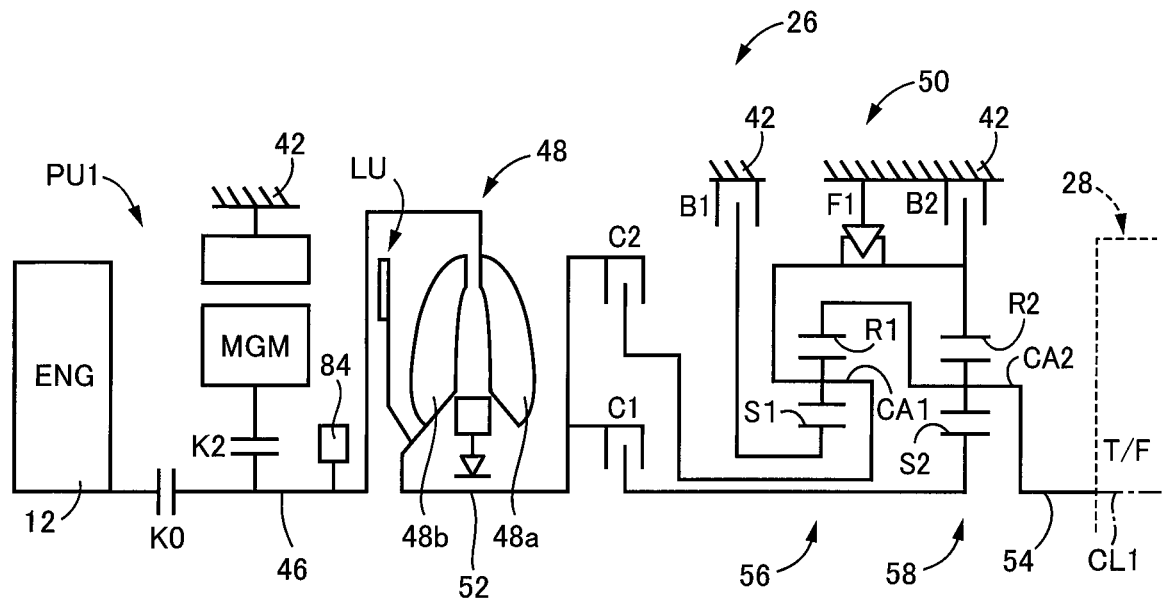
FIG. 2 is a view schematically showing a construction of a hybrid transmission (HEV T/M) shown in FIG. 1.
FIG. 3 is a table indicating a relationship between each AT gear position of an automatic transmission shown in FIG. 2 and a combination of engagement devices that are to be placed in engaged states to establish the each gear position.

FIG. 2 is a view schematically showing a construction of the hybrid transmission 26. As shown in FIG. 2, the hybrid transmission 26 includes a connection shaft 46, the torque converter 48 and the automatic transmission 50 which are provided inside the transmission case 42 and which are disposed on a common axis in the form of a rotation axis CS1. Each of the torque converter 48 and the automatic transmission 50 is constructed substantially symmetrically about the rotation axis CL1, so that its lower half (that is located on a lower side of the rotation axis CL1) is not shown in FIG. 2. The rotation axis CL1 corresponds to an axis of a crankshaft of the engine 12, an axis of the connection shaft 46 connected to the crankshaft, an axis of a transmission input shaft 52 that is an input rotary member of the automatic transmission 50 and an axis of a transmission output shaft 54 that is an output rotary member of the automatic transmission 50.

The connection shaft 46 is a rotary shaft connecting between the engine 12 and the torque converter 48. An engine connecting/disconnecting clutch K0 is provided between the engine 12 and the connection shaft 46, and is configured to selectively connect and disconnect between the engine 12 and the connection shaft 46. The TM rotary electric machine MGM is disposed on the rotation axis CL1, and is provided inside the transmission case 42. The TM rotary electric machine MGM is connected to the connection shaft 46 in in a power transmittable manner, via a rotary-electric-machine connecting/disconnecting clutch K2 that is configured to selectively connect and disconnect between the connection shaft 46 and the TM rotary electric machine MGM. The torque converter 48 includes a pump impeller 48a connected to the connection shaft 46, and a turbine impeller 48b connected to the transmission input shaft 52. The pump impeller 48a is an input member of the torque converter 48, while the turbine impeller 48b is an output member of the torque converter 48. The connection shaft 46 is also an input rotary member of the torque converter 48. The transmission input shaft 52 is also an output rotary member of the torque converter 48 which is provided integrally with a turbine shaft that is to be driven and rotated by the turbine impeller 48b. The torque converter 48 is a fluid transmission device configured to transmit the power of the first power source PU1 to the transmission input shaft 52 through fluid, namely, a fluid transmission device configured to transmit the power of the first power source PU1 from the pump impeller 48a to the turbine impeller 48b through fluid. The torque converter 48 includes a lockup clutch LU configured to connect between the pump impeller 48a and the turbine impeller 48b. The lockup clutch LU is a known lockup clutch, namely, a direct connection clutch configured to connect between the input and output rotary members of the torque converter 48.

The automatic transmission 50 is disposed in a power transmission path between the torque converter 48 and the transfer 28. The transmission output shaft 54 is connected to the transfer 28. The automatic transmission 50 is a mechanical transmission device configured to transmit the power of the first power source PU1 to the transfer 28. Thus, each of the torque converter 48 and the automatic transmission 50 is configured to transmit the power of the first power source PU1 to the transfer 28.

The automatic transmission 50 is a known automatic transmission of planetary gear type that includes, for example, a plurality of planetary gear devices in the form of first and second planetary gear devices 56, 58, and a plurality of engagement devices in the form of a one-way clutch F1, clutches C1, C2 and brakes B1, B2. Hereinafter, the clutches C1, C2 and the brakes B1, B2 will be simply referred to as "engagement devices CB" unless they are to be particularly distinguished from one another.

Each of the engagement devices CB is a known hydraulically-operated frictional engagement device in the form of a multiple-disc type or a single-disc type clutch or brake that is to be pressed by a hydraulic actuator, or a band brake that is to be tightened by a hydraulic actuator. Each of the engagement devices CB is configured to receive a CB hydraulic pressure PRcb that is a regulated hydraulic pressure supplied from a hydraulic control circuit or unit 60 (see FIG. 1) provided in the vehicle driving apparatus 10, whereby a CB torque Tcb, i.e., torque capacity of the engagement device CB is changed and its controlled or operation state is switched between an engaged state and a released state, for example. The hydraulic control unit 60 includes a plurality of solenoid valves for controlling hydraulic pressures and a plurality of solenoid valves for switching fluid passages, and is to be controlled by the electronic control device 130 that is described below.

In the automatic transmission 50, rotary elements of the first and second planetary gear devices 56, 58 are to be connected to each other directly or indirectly via the engagement devices CB or the one-way clutch F1, or to the transmission input shaft 52, the transmission case 42 or the transmission output shaft 54. The rotary elements of the first planetary gear device 56 are a sun gear S1, a carrier CA1 and a ring gear R1. The rotary elements of the second planetary gear device 58 are a sun gear S2, a carrier CA2 and a ring gear R2.

The automatic transmission 50 is a step-variable automatic transmission configured to establish a selected one of a plurality of gear positions, with a corresponding one or ones of the engagement devices CB being engaged, wherein the gear positions are different from each other in gear ratio (speed ratios) γat (=AT input rotational speed Ni/AT output rotational speed No). The automatic transmission 50 is configured to switch from one of the gear positions to another one of the gear positions, namely, to establish one of the gear positions which is selected, by the electronic control device 130, depending on, for example, an accelerating operation made by a vehicle driver (operator) and a running speed V of the vehicle 8. In the description of the present embodiment, the gear positions that are to be established in the automatic transmission 50 will be referred to as "AT gear positions". The AT input rotational speed Ni is a rotational speed of the transmission input shaft 52, and is an input rotational speed of the automatic transmission 50. The AT input rotational speed Ni is equal to a turbine rotational speed Nt that is a rotational speed of the turbine shaft that is to be driven and rotated by the turbine impeller 48b. The AT output rotational speed No is a rotational speed of the transmission output shaft 54, and is an output rotational speed of the automatic transmission 50.

As shown in a table of FIG. 3, the automatic transmission 50 is configured to establish a selected one of the plurality of AT gear positions including four forward gear positions for establishing respective gear ratios γat that are different from one another. Among the four forward gear positions, an AT1-speed gear position (represented by "1st" in the table of FIG. 3) provides the highest gear ratio γat, and an AT4-speed gear position (represented by "4th" in the table of FIG. 3) provides the lowest gear ratio γat and enables the vehicle 8 to run at a higher running speed V than the other gear positions. The table of FIG. 3 indicates a relationship between each of the AT gear positions and a combination of the engagement devices CB that are to be placed in engaged states to establish the each of the AT gear positions. In the table, "◯" indicates that the corresponding engagement device CB is placed in its engaged state, "Δ" indicates that the corresponding engagement device CB is placed in its engaged state during application of an engine brake to the vehicle 8 or during a coasting shift-down action of the automatic transmission 50, and blank indicates that the corresponding engagement device CB is placed in its released (disengaged) state. In a neutral state (represented by "N" in the table of FIG. 3) of the automatic transmission 50 which is established, for example, with all of the engagement devices CB being placed in the released states, the automatic transmission 50 is placed in a power untransmittable state in which the power is not transmittable through the automatic transmission 50, namely, a power transmission through the automatic transmission 50 is cut off. When the vehicle 8 is to run in a reverse direction, the automatic transmission 50 is placed in the neutral state (see "Rev" in the table of FIG. 3), with the power being outputted by the TF rotary electric machine MGF, for example.

Figure 4:
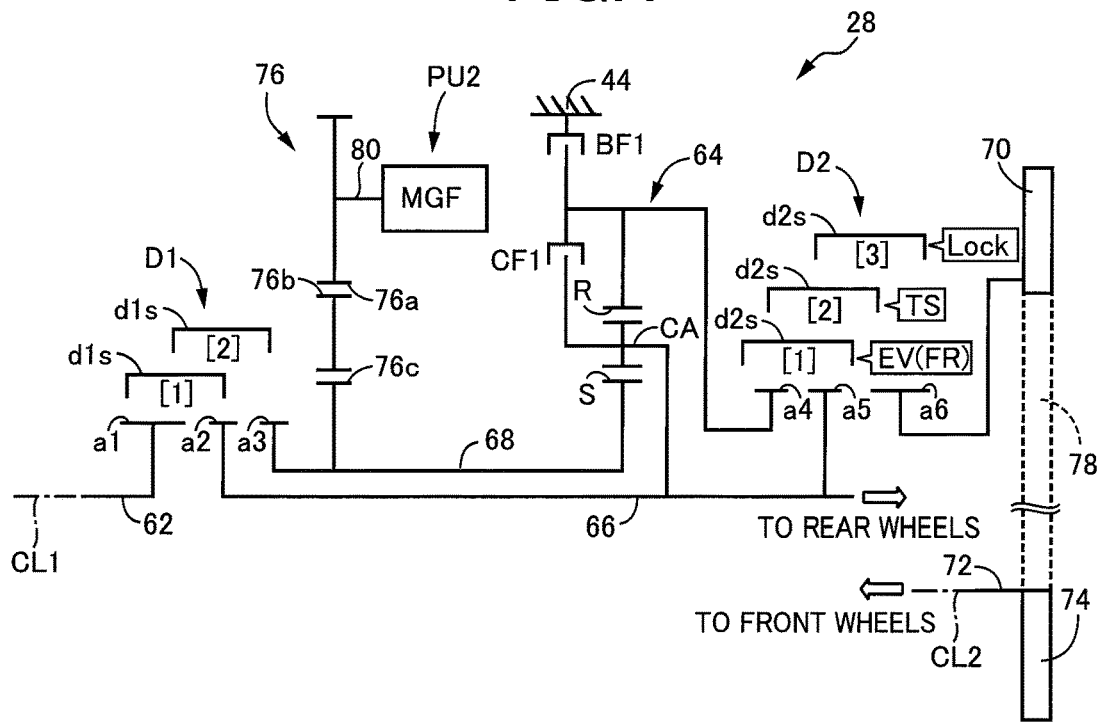
FIG. 4 is a view schematically showing a construction of a transfer (T/F) shown in FIG. 1.

FIG. 4 is a view schematically showing a construction of the transfer 28. As shown in FIG. 4, the transfer 28 includes a TF input shaft 62, the above-described TF rotary electric machine MGF, a differential device 64, a TF clutch CF1, a TF brake BF1, a first output shaft 66, an intermediate shaft 68, first and second dog clutches D1, D2 and a drive gear 70, which are provided inside the transfer case 44 and which are disposed on the common rotation axis CL1. Each of the differential device 64, TF clutch CF1, TF brake BF1, intermediate shaft 68, first and second dog clutches D1, D2 and drive gear 70 is constructed substantially symmetrically about the rotation axis CL1, so that its lower half (that is located on a lower side of the rotation axis CL1) is not shown in FIG. 4. The rotation axis CL1 of the transfer 28 is the same as the rotation axis CL1 of the hybrid transmission 26.

The transfer 28 further includes a second output shaft 72 and a driven gear 74 which are provided inside the transfer case 44 and which are disposed on a common axis in the form of a rotation axis CL2. The driven gear 74 is constructed substantially symmetrically about the rotation axis CL2, so that its upper half (that is located on an upper side of the rotation axis CL2) is not shown in FIG. 4. The rotation axis CL2 corresponds to an axis of the second output shaft 72, for example.

The transfer 28 further includes the TF rotary electric machine MGF, a connection gear mechanism 76 and a chain 78 that are provided inside the transfer case 44. The connection gear mechanism 76 includes a TF rotary-electric-machine connection gear 76a that is to be rotated integrally with a rotor shaft 80 of the TF rotary electric machine MGF, an idle gear 76b that constantly meshes with the TF rotary-electric-machine connection gear 76a, and a TF reaction-force input gear 76c that constantly meshes with the idle gear 76b. The chain 78 is a member connecting between the drive gear 70 and the driven gear 74.

The transfer 28 further includes a switch actuator 82 (see FIG. 1) fixed to the transfer case 44. The switch actuator 82 is an actuator provided to operate the first and second dog clutches D1, D2.

Each of the TF clutch CF1 and the TF brake BF1 is a known wet-type hydraulically-operated frictional engagement device constituted by a multiple-disc type or single-disc type clutch that is to be pressed by a hydraulic actuator. A controlled state (engaged/released state) of the TF clutch CF1 is switched with change of a CF1 torque Tcf1 that is a torque capacity of the TF clutch CF1, wherein the change of the CF1 torque Tcf1 is made by a CF1 pressure PRcf1 that is a hydraulic pressure of the TF clutch CF1 supplied and regulated by the hydraulic control unit 60. Similarly, a controlled state of the TF brake BF1 is switched with change of a BF1 torque Tbf1 that is a torque capacity of the TF brake BF1, wherein the change of the BF1 torque Tbf1 is made by a BF1 pressure PRbf1 that is a hydraulic pressure of the TF brake BF1 supplied and regulated by the hydraulic control unit 60. Each of the first and second dog clutches D1, D2 is a known dog clutch, i.e., a known claw clutch. With the switch actuator 82 being controlled by the electronic control device 130 that is described below, the controlled state of each of the first and second dog clutches D1, D2 is switched.

The TF input shaft 62 is connected to the transmission output shaft 54 in a power transmittable manner. The first output shaft 66 is connected to the rear propeller shaft 32 in a power transmittable manner. The second output shaft 72 is connected to the front propeller shaft 30 in a power transmittable manner. The driven gear 74 is fixed to the second output shaft 72, unrotatably relative to the second output shaft 72. The TF reaction-force input gear 76c is fixed to the intermediate shaft 68, unrotatably relative to the intermediate shaft 68.

The differential device 64 is constituted by a single-pinion-type planetary gear device, and includes a sun gear S, a carrier CA and a ring gear R. The sun gear S is fixed to the intermediate shaft 68, unrotatably relative to the intermediate shaft 68, so that the TF rotary electric machine MGF is connected to the sun gear S via the connection gear mechanism 76. The carrier CA is connected to the first output shaft 66, unrotatably relative to the first output shaft 66. The ring gear R is selectively connected to the transfer case 44 via the TF brake BF1. The carrier CA and the ring gear R are selectively connected to each other via the TF clutch CF1. The TF clutch CF1 serves as a differential limiting clutch for causing the differential device 64 to be integrally rotatable, and may be provided to connect between any two of the sun gear S, carrier CA and ring gear R, to each other.

The first dog clutch D1 includes first dog teeth a1, second dog teeth a2, third dog teeth a3 and a first sleeve d1s, and is disposed among the TF input shaft 62 to which the force of the first power source PU1 is to be transmitted, the first output shaft 66 and the intermediate shaft 68 that is connected to the sun gear S, as shown in FIG. 4. The first dog teeth a1 is fixed to the TF input shaft 62, unrotatably relative to the TF input shaft 62. The second dog teeth a2 is fixed to the first output shaft 66, unrotatably relative to the first output shaft 66. The third dog teeth a3 is fixed to the intermediate shaft 68, unrotatably relative to the intermediate shaft 68. The first sleeve d1s is movable relative to the first, second and third dog teeth a1, a2, a3, in a direction of the rotation axis CL1, i.e., in a direction parallel to the rotation axis CL1. The first sleeve d1s has inner circumferential teeth that can mesh with the first, second and third dog teeth a1, a2, a3, so as to be unrotatable relative to the TF input shaft 62, first output shaft 66 and intermediate shaft 68. With the first sleeve d1s being moved in the direction of the rotation axis CL1 by operation of the switch actuator 82, the first sleeve d1s is engaged with or released from the first, second and third dog teeth a1, a2, a3. When the first dog clutch D1 is placed in a first state [1] (see FIG. 4), the first sleeve d1s is engaged with the first dog teeth a1 and the second dog teeth a2 whereby the first and second dog teeth a1, a2 are connected to each other so that the TF input shaft 62 and the first output shaft 66 are connected to each other while the intermediate shaft 68 is disconnected from the TF input shaft 62 and the first output shaft 66. When the first dog clutch D1 is placed in a second state [2] (see FIG. 4), the first sleeve d1s is engaged with the first dog teeth a1 and the third dog teeth a3 whereby the first and third dog teeth a1, a3 are connected to each other whereby the TF input shaft 62 and the intermediate shaft 68 are connected to each other while the first output shaft 66 is disconnected from the input shaft 62 and the intermediate shaft 68. The first dog clutch D1 corresponds to a first connecting/disconnecting device. It is noted that FIG. 4 shows the first sleeve d1s when the first sleeve d1s is placed in each of the first state [1] and the second state [2], for convenience of description.

The second dog clutch D2 includes fourth dog teeth a4, fifth dog teeth a5, sixth dog teeth a6 and a second sleeve d2s, and is disposed among the ring gear R of the differential device 64, the first output shaft 66 and the second output shaft 72. The fourth dog teeth a4 is fixed to the ring gear R. The fifth dog teeth a5 is fixed to the carrier CA. The sixth dog teeth a6 is fixed to the first output shaft 66, unrotatably relative to the first output shaft 66. The second sleeve d2s is movable relative to the fourth, fifth and sixth dog teeth a4, a5, a6, in the direction of the rotation axis CL1. The second sleeve d2s has inner circumferential teeth that can mesh with the fourth, fifth and sixth dog teeth a4, a5, a6, so as to be unrotatable relative to the ring gear R, carrier CA and first output shaft 66. With the second sleeve d2s being moved in the direction of the rotation axis CL1 by operation of the switch actuator 82, the second sleeve d2s is engaged with or released from the fourth, fifth and sixth dog teeth a4, a5, a6. When the second dog clutch D2 is placed in a first state [1] (see FIG. 4), the second sleeve d2s is not engaged with any one of the fourth, fifth and sixth dog teeth a4, a5, a6 so that a neutral state is established with any one of the fourth, fifth and sixth dog teeth a4, a5, a6 being not connected to the others of the fourth, fifth and sixth dog teeth a4, a5, a6. With the neutral state being established, the power transmission among the ring gear R, the first output shaft 66 and the drive gear 70 is cut off. When the second dog clutch D2 is placed in a second state [2] (see FIG. 4), the second sleeve d2s is engaged with the fourth dog teeth a4 and the sixth dog teeth a6 whereby the fourth and sixth dog teeth a4, a6 are connected to each other so that the ring gear R and the drive gear 70 are connected to each other while the first output shaft 66 is disconnected from the ring gear R and the drive gear 70. When the second dog clutch D2 is placed in a third state [3] (see FIG. 4), the second sleeve d2s is engaged with the fifth dog teeth a5 and the sixth dog teeth a6 whereby the fifth and sixth dog teeth a5, a6 are connected to each other so that the first output shaft 66 and the drive gear 70 are connected to each other while the ring gear R is disconnected from the first output shaft 66 and the drive gear 70. The second dog clutch D2 corresponds to a second connecting/disconnecting device. It is noted that FIG. 4 shows the second sleeve d2s when the second sleeve d2s is placed in each of the first state [1], second state [2] and third state [3], for convenience of description.

Figure 5:
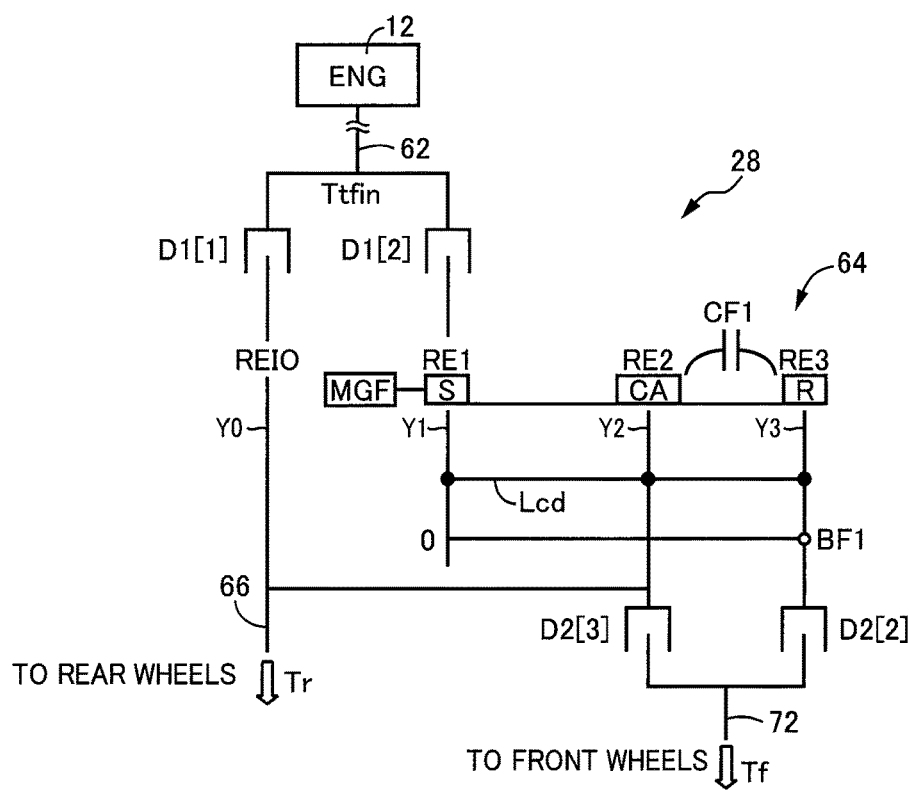
FIG. 5 is a collinear chart indicating a relationship among rotational speeds of rotary elements of the transfer of FIG. 4.

FIG. 5 is a collinear chart indicating a relationship among rotational speeds of rotary elements of the transfer 28. In FIG. 5, three vertical lines Y1, Y2, Y3 corresponding to the three rotary elements of the differential device 64 constituting the transfer 28 are an axis representative of a rotational speed of the sun gear S corresponding to a first rotary element RE1, an axis representative of a rotational speed of the carrier CA corresponding to a second rotary element RE2, and an axis representative of a rotational speed of the ring gear R corresponding to a third rotary element RE3, in order from the left side. Intervals among the three vertical lines Y1, Y2, Y3 are dependent on a gear ratio γg (=number of teeth of sun gear S/number of teeth of ring gear R). Specifically, the interval between the vertical lines Y2 and Y3 corresponds to the gear ratio γg where the interval between the vertical lines Y1 and Y2 corresponds to 1. Further, in FIG. 5, a vertical line Y0, which is located on a left side of the vertical line Y1, is an axis representative of a rotational speed of the first output shaft 66 that equals to a rotational speed of the carrier CA corresponding to the second rotary element RE2 of the differential device 64. The first output shaft 66 corresponds to an input/output rotary element REIO.

As shown in the collinear chart of FIG. 5, in the transfer 28, the input/output rotary element REIO is selectively connected to the TF input shaft 62 via the first dog clutch D1 that is placed in the first state [1], and is connected to the rear propeller shaft 32. The first power source PU1 including the engine 12 is connected to the TF input shaft 62 via the hybrid transmission 26 in a power transmittable manner. Further, in the differential device 64, the first rotary element RE1 is connected to the TF rotary electric machine MGF in a power transmittable manner, and is selectively connected to the TF input shaft 62 via the first dog clutch D1 that is placed in the second state [2]. The second rotary element RE2 is connected to the first output shaft 66, and is selectively selected to the second output shaft 72, i.e., the front propeller shaft 30, via the second dog clutch D2 that is placed in the third state [3]. The third rotary element RE3 is selectively connected to the second output shaft 72 via the second dog clutch D2 that is placed in the third state [2], and is selectively connected to the transfer case 44 via the TF brake BF1. Moreover, the second and third rotary elements RE2, RE3 are selectively connected to each other via the TF clutch CF1. In the collinear chart of FIG. 5, the relationship among the rotational speeds of the respective first, second and third rotary elements RE1, RE2, RE3 in the differential device 64 is represented by a straight line Lcd. The first output shaft 66 is an output shaft to which the power of the first power source PU1 is to be inputted via the hybrid transmission 26 and from which is the power is to be outputted to the rear wheels 16. The second output shaft 72 is an output shaft from which the power is to be outputted to the front wheels 14.

In the differential device 64, when the TF clutch CF1 is in the engaged state and the TF brake BF1 is in the released state, the first, second and third rotary elements RE1, RE2, RE3 are rotatable integrally with one another. On the other hand, in the differential device 64, when the TF clutch CF1 is in the released state and the TF brake BF1 is in the engaged state, the rotational speed of the second rotary element RE2 is made lower than the rotational speed of the first rotary element RE1, where the first rotary element RE1 and the second rotary element RE2 are used as an input member and an output member, respectively. Thus, the differential device 64 serves as a speed change device that is to be placed in a selected one of a high gear position and a low gear position, wherein the differential device 64 is placed in the high gear position with the TF clutch CF1 being placed in the engaged state, and is placed in the low gear position with the TF brake BF1 being placed in the engaged state.

The differential device 64 is capable of activating a differential effect when both of the F clutch CF1 and the TF brake BF1 being are in the released states. Thus, the differential device 64 serves as a center differential. In this instance, with the first dog clutch D1 being in the first state [1] and with the second dog clutch D2 being in the second state [2] in the transfer 28, the differential device 64 can cause the torque of the first power source PU1 inputted to the third rotary element RE3, to be distributed to the second rotary element RE2, owing a reaction torque of the TF rotary electric machine MGF connected to the first rotary element RE1. Further, the differential device 64 can cause the torque of the first power source PU1 inputted to the third rotary element RE3, to be distributed to the second rotary element RE2, also by limiting the differential effect of the differential device 64 by placing the TF clutch CF1 in a slipping state, in place of applying the reaction torque of the TF rotary electric machine MGF. Thus, the transfer 28 is a power distribution device configured to distribute a part of the torque inputted to the first output shaft 66, to the second output shaft 72, for thereby making it possible to distribute the torque between the front wheels 14 and the rear wheels 16. It is noted that, in the transfer 28, when the second dog clutch D2 is in the third state [3], the differential device 64 is placed in a differential lock state in which the differential device 64 does not function as the center differential.

Figures 6, 7:
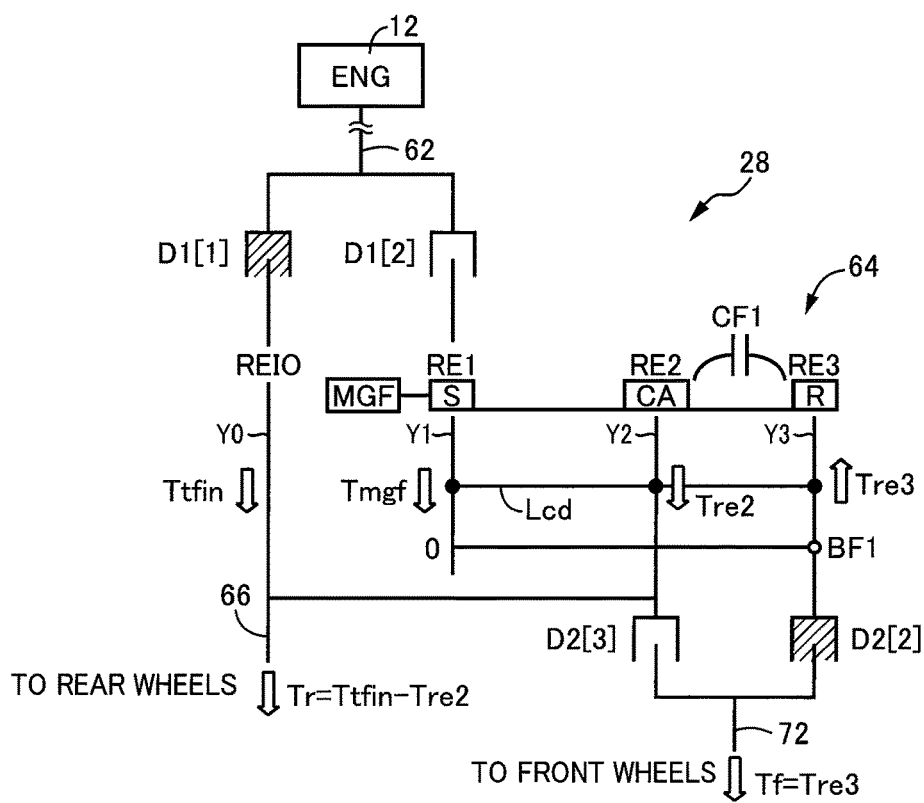
FIG. 6 is a table indicating a relationship between each mode established in the transfer of FIG. 4 and controlled states of respective engagement devices in the transfer of FIG. 4.
FIG. 7 is a collinear chart indicating torques applied to various parts of the transfer of FIG. 4 in "H4_TORQUE SPLIT" mode shown in FIG. 6.

FIG. 6 is a table indicating a relationship between each mode established in the transfer 28 and controlled states of respective the engagement devices in the transfer 28. In FIG. 6, "603 " in columns of the TF brake BF1 and the TF clutch CF1 indicates that the TF brake BF1 or TF clutch CF1 is in its engaged state, and blank in the columns of the TF brake BF1 and the TF clutch CF1 indicates that the TF brake BF1 or TF clutch CF1 is in its released state. Further, in FIG. 6, "○" in columns of the first and second dog clutches D1, D2 indicates that the first dog clutch D1 or second dog clutch D2 is placed in the corresponding state, and "(○)" in the column of the first dog clutch D1 indicates that the first dog clutch D1 may be placed in its released state where the first dog clutch D1 can be placed in the released state (neutral state).

FIG. 6 shows six modes numbered from m1 to m6. Each of "EV (FR) HIGH" mode of number m1 and "EV (FR) LOW" mode of number m2 is established with a corresponding one of the TF clutch CF1 and the TF brake BF1 being placed in the engaged state and with the first and second dog clutches D1, D2 being placed in the respective first states [1]. Each of the "EV (FR) HIGH" mode and the "EV (FR) LOW" mode is a BEV driving mode that enables a motor running (=BEV running) in which the vehicle 8 runs, for example, with only the TF rotary electric machine MGF serving as the power source, and with operation of the first power source PU1 being stopped. With the second dog clutch D2 being placed in the first state [1], the neutral state (see "N" in FIG. 6) is established with any one of the fourth, fifth and sixth dog teeth a4, a5, a6 being not connected to the others of the fourth, fifth and sixth dog teeth a4, a5, a6, so that a power transmission path between the differential device 64 and the front wheels 14 is cut off. In this state in which the second dog clutch D2 being placed in the first state [1], the power of the TF rotary electric machine MGF is transmitted toward the rear wheels 16 in the differential device 64 in which the high gear position is established with the TF clutch CF1 being in the engaged state or the low gear position is established with the TF brake BF1 being in the engaged state. Thus, in the present embodiment, the BEV running is performed by a rear-wheel drive running. In the BEV driving mode, it is possible to avoid drag of the engine 12, for example, with the engine connecting/disconnecting clutch K0 being placed in the released state or with the automatic transmission 50 being placed in the neutral state when the first dog clutch D1 is in the first state [1]. Where the first dog clutch D1 can be placed in the released state, it is possible to avoid drag of the engine 12 and drag of the automatic transmission 50, with the first dog clutch D1 being placed in the released state, even without the engine connecting/disconnecting clutch K0 and the automatic transmission 50 being placed in the released or neutral state. It is noted that, in the "EV (FR) HIGH" mode and the "EV (FR) LOW" mode, although the first dog clutch D1 may be placed in the second state [2], the first dog clutch D1 is placed in the first state [1] in view of switching to the "H4_TORQUE SPLIT" mode or the "H4_LSD" mode in the present embodiment.

"H4_TORQUE SPLIT" mode of number m3 is established with both of the TF clutch CF1 and the TF brake BF1 being placed in the respective released states and with the first dog clutch D1 and the second dog clutch D2 being placed in the first state [1] and the second state [2], respectively. The "H4_TORQUE SPLIT" mode is a mode for distributing the torque between the front wheels 14 and the rear wheels 16 at a desired ratio that is dependent on the reaction torque of the TF rotary electric machine MGF, for example, with the torque of the first power source PU1 transmitted from the first output shaft 66 to the second rotary element RE1 of the differential device 64 being held by the first rotary element RE1 to which the reaction torque (negative torque) of the TF rotary electric machine MGF is applied, and with the differential device 64 being placed in a state corresponding to the high gear position, namely, with the first, second and third rotary elements RE1-RE3 being rotated substantially as the same rotational speed. In the "H4_TORQUE SPLIT" mode established in the transfer 28, the TF rotary electric machine MGF performs an electric-power generation control (regenerative control) for generating the reaction torque.

FIG. 7 is a collinear chart when the "H4_TORQUE SPLIT" mode is established in the transfer 28. From the first power source PU1 that is the power source in this mode, a TF input torque Ttfin is transmitted to the first output shaft 66 via the first dog clutch D1, while the MGF torque Tmgf as the electric-power generation torque of the TF rotary electric machine MGF is applied to the first rotary element RE1 of the differential device 64. Since the differential device 64 is allowed to achieve the differential effect and the TF input torque Ttfin acts on the second rotary element RE2 in a forward rotation direction, if the MGF torque Tmgf that is a negative torque is applied as a reaction force to the first rotary element RE1, a negative RE2 torque Tre2 is generated as a rotational resistance in the second rotary element RE2, and a positive RE3 torque Tre3 is generated as a drive torque in the third rotary element RE3. The RE2 torque Tre2 and the RE3 torque Tre3 can be represented by respective expressions (1), (2) given below, where "γg" is the gear ratio γg of the differential device 64. Then, as shown in expression (3), a torque, which is a sum of the TF input torque Ttfin and the RE2 torque Tre2, is outputted as a rear wheel torque Tr from the first output shaft 66 toward the rear wheels 16. Further, as shown in expression (4), the RE3 torque Tre3 is outputted as a front wheel torque Tf from the second output shaft 72 toward the front wheels 14. That is, a part of the TF input torque Ttfin, which is transmitted from the first power source PU1 to the first output shaft 66, is distributed by the transfer 28 to the second output shaft 72, so as to be transmitted toward the front wheels 14. The front wheel torque Tf is increased with increase of the MGF torque Tmgf, while the rear wheel torque Tr is reduced with increase of the MGF torque Tmgf. It is noted that a rotary shaft of the drive gear 70, which is connected to the third rotary element RE3 via the second dog clutch D2, also may be interpreted to correspond to the second output shaft that is configured to output the power toward the front wheels 14. It is also noted that the expression (4) is for a case in which the drive gear 70 and the driven gear 74 are the same in number of teeth.

$$Tre2 = -(1+1/\gamma g)Tmgf \quad (1)$$

$$Tre3 = (1/\gamma g)Tmgf \quad (2)$$

$$Tr = Ttfin + Tre2 = Ttfin - (1+1/\gamma g)Tmgf \quad (3)$$

$$Tf = Tre3 = (1/\gamma g)Tmgf \quad (4)$$

Referring back to FIG. 6, "H4_LSD" mode of number m4 is established with the TF clutch CF1 being controlled in the slipping state and the TF brake BF1 being placed in the released state, and with the first dog clutch D1 and the second dog clutch D2 being placed in the first state [1] and the second state [2], respectively. The "H4_LSD" mode is a mode for distributing the torque between the front wheels 14 and the rear wheels 16 at a desired ratio that is dependent on the torque capacity of the TF clutch CF1, by limiting the differential effect of the differential device 64 by placing the TF clutch CF1 in the slipping state, in place of applying the reaction torque of the TF rotary electric machine MGF in the "H4_TORQUE SPLIT" mode, so that a part of the TF input torque Ttfin transmitted to the first output shaft 66 is transmitted to the second output shaft 72 through the third rotary element RE3.

"H4_Lock" mode of number m5 is established with both of the TF clutch CF1 and the TF brake BF1 being placed in the respective released states and with the first dog clutch D1 and the second dog clutch D2 being placed in the first state [1] and the third state [3], respectively. The "H4_Lock" mode is a mode for distributing the TF input torque Ttfin, which is transmitted from the first power source PU1 to the first output shaft 66 via the first dog clutch D1, between the front wheels 14 and the rear wheels 16, with the differential device 64 being placed substantially in the differential lock state owing to direction connection between the first and second output shafts 66, 72.

"L4_Lock" mode of number m6 is established with the TF clutch CF1 and the TF brake BF1 being placed in the released state and the engaged state, respectively and with the first dog clutch D1 and the second dog clutch D2 being placed in the second state [2] and the third state [3], respectively. The "L4_Lock" mode is a mode for distributing the torque, which is transmitted from the first power source PU1 to the sun gear S of the differential device 64 via the first dog clutch D1, between the front wheels 14 and the rear wheels 16, with the differential device 64 being placed substantially in the differential lock state (owing to direction connection between the first and second output shafts 66, 72) and with the differential device 64 being placed in the low gear position.

Referring back to FIG. 1, the vehicle driving apparatus 10 includes an MOP 84 that is a mechanically-operated oil pump, an EOP 86 that is an electrically-operated oil pump, and a pump motor 88. The MOP 84 is connected to the connection shaft 46 (see FIG. 2), and is to be driven and rotated by the first power source PU1, so as to output a working fluid OIL that is to be used in the power transmission apparatus 18. The pump motor 88 is a motor serving exclusively to drive and rotate the EOP 86. The EOP 86 outputs the working fluid OIL, when being driven and rotated by the pump motor 88. The working fluid OIL outputted by the MOP 84 and the EOP 86 is supplied to the hydraulic control unit 60. The hydraulic control unit 60, which receives the working fluid OIL as an original hydraulic pressure, supplies regulated hydraulic pressures that serve as the CB hydraulic pressure PRcb, the CF1 pressure PRcf1 and the BF1 pressure PRbf1, for example.

The vehicle driving apparatus 10 is provided with the electronic control device 130 as a controller including a control device that is configured to control the first and second power sources PU1, PU2 and the transfer 28. FIG. 1 shows an input/output system of the electronic control device 130, and is also a functional block diagram explaining major portions of control functions of the electronic control device 130. The electronic control device 130 includes a so-called microcomputer incorporating a CPU, a ROM, a RAM and an input-output interface. The CPU performs various control operations of the vehicle driving apparatus 10, by processing various input signals, according to control programs stored in the ROM, while utilizing a temporary data storage function of the RAM. The electronic control device 130 may be constituted by two or more control units exclusively assigned to perform respective different control operations such as an engine control operation and a shift control operation.

The electronic control device 130 receives various input signals based on values detected by respective sensors provided in the vehicle driving apparatus 10. Specifically, the electronic control device 130 receives: an output signal of an engine speed sensor 90 indicative of an engine rotational speed Ne that is a rotational speed of the engine 12; an output signal of an MGM speed sensor 92 indicative of an MGM rotational speed Nmgm that is a rotational speed of the TM rotary electric machine MGM, an output signal of a turbine speed sensor 94 indicative of a turbine rotational speed Nt that is equal to the AT input rotational speed Ni; an output signal of an AT output speed sensor 96 indicative of the AT output rotational speed No; an output signal of a vehicle speed sensor 98 indicative of a TF output rotational speed Nof which is a rotational speed of the first output shaft 66 and which corresponds to the vehicle running speed V; an output signal of an MGF speed sensor 100 indicative of an MGF rotational speed Nmgf that is a rotational speed of the TF rotary electric machine MGF; an output signal of an accelerator-opening degree sensor 102 indicative of an accelerator opening degree (accelerator operation degree) θacc representing an amount of accelerating operation made by the vehicle driver; an output signal of a throttle-opening degree sensor 104 indicative of a throttle opening degree θth which is an opening degree of an electronic throttle valve; an output signal of a brake pedal sensor 106 which is a brake-ON signal Bon representing a state in which a brake pedal is being operated by the vehicle driver so as to operate wheel brakes; an output signal of a shift position sensor 108 indicative of a shift operation position POSsh that is an operation position of a shift lever provided in the vehicle 8; an output signal of an acceleration sensor 110 indicative of a longitudinal acceleration Gx and a lateral acceleration Gy of the vehicle 8; an output signal of a yaw rate sensor 112 indicative of a yaw rate Ryaw that is a rotational angular speed of the vehicle 8 about its vertical axis; an output signal of a steering sensor 114 indicative of a steering angle θsw and a steering direction Dsw of a steering wheel provided in the vehicle 8; an output signal of a battery sensor 116 indicative of a battery temperature THbat, a battery charging/discharging electric current Ibat and a battery voltage Vbat of the battery 24; an output signal of a fluid temperature sensor 118 indicative of a working-fluid temperature THoil that is a temperature of the working fluid OIL in the hydraulic control unit 60; an output signal of a differential-lock selection switch 120 which is a lock-mode ON signal LOCKon indicating that the "H4_Lock" mode or "L4_Lock" mode is selected by the vehicle driver; and an output signal of a low-gear selection switch 122 which is a low-gear ON signal LOWon indicating that the low gear position of the speed change device 83 is selected by the vehicle driver.

The above-described differential-lock selection switch 120 and low-gear selection switch 122 are provided in vicinity of a driver seat of the vehicle 8. The differential-lock selection switch 120 is a switch that is to be placed in its ON state by the vehicle driver when the differential device 64 is to be placed in the differential lock state in the transfer 28. The low-gear selection switch 122 is a switch that is to be placed in its ON state by the vehicle driver when the speed change device 83 is to be placed in the low gear position during the "H4_Lock" mode established in the transfer 28.

The electronic control device 130 generates various output signals to the various devices provided in the vehicle 8, such as: an engine control command signal Se that is to be supplied to the engine control device 20 for controlling the engine 12; an MGM control command signal Smgm that is to be supplied to the inverter 22 for controlling the TM rotary electric machine MGM; an MGF control command signal Smgf that is to be supplied to the inverter 22 for controlling the TF rotary electric machine MGF; a hydraulic command signal Sat that is to be supplied to the hydraulic control unit 60 for controlling the controlled state of each of the engagement devices CB so as to control the automatic transmission 50; a hydraulic command signal Scbf that is to be supplied to the hydraulic control unit 60 for controlling the controlled state of each of the TF clutch CF1 and the TF brake BF1 so as to control the transfer 28; a transfer control command signal Stf that is to be supplied to the switch actuator 82 for operating the first and second dog clutches D1, D2 so as to control the transfer 28; an EOP control command signal Seop that is to be supplied to the pump motor 88 for controlling the EOP 86; a brake control command signal Sb that is to be supplied to a wheel brake device 124 for controlling a braking force generated by each wheel brake; and an information-notification control command signal Sinf that is to be supplied to an information notification device 126 for notifying various information to the vehicle driver. The information notification device 126 is a display device or sounding device configured to inform various information with images and sounds.

For performing various control operations in the vehicle driving apparatus 10, the electronic control device 130 includes an AT shift control means in the form of an AT shift control portion 132, a hybrid control means in the form of a hybrid control portion 134 and a drive-state control means in the form of a drive-state control portion 140.

Figure 8:
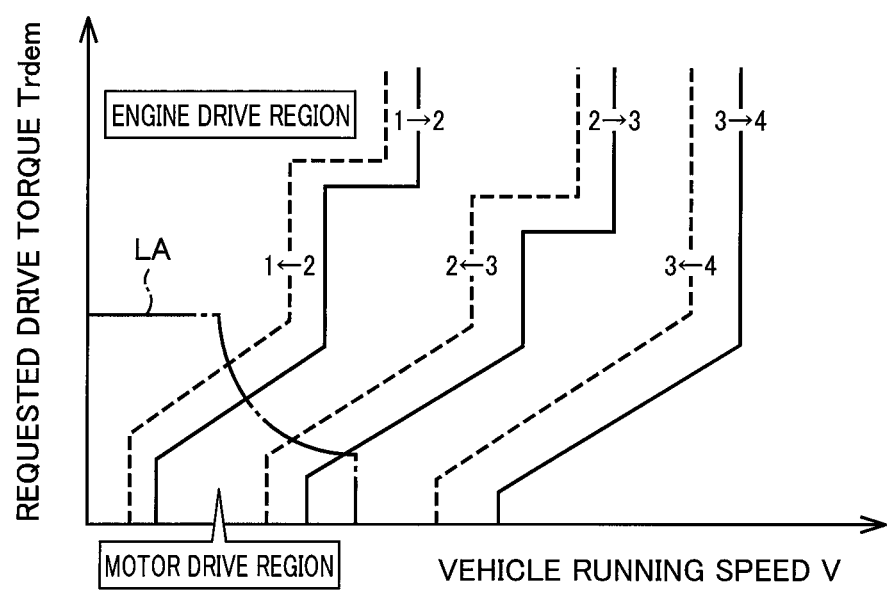
FIG. 8 is a view showing, by way of examples, an AT-gear-position shifting map used for controlling gear shifting in the automatic transmission, a driving-mode switching map used for switching a driving mode, and a relationship between the shifting map and the driving-mode switching map.

The AT shift control portion 132 determines whether a shifting action is to be executed in the automatic transmission 50, by using an AT-gear-position shifting map shown in FIG. 8, for example, and outputs the hydraulic command signal Sat, as needed, which is supplied to the hydraulic control unit 60, for executing the shifting action in the automatic transmission 50. The AT-gear-position shifting map represents a predetermined relationship, i.e., a pre-stored relationship obtained by experimentation or determined by an appropriate design theory. In the AT-gear-position shifting map, the predetermined relationship is represented by shifting lines in two-dimensional coordinates in which the vehicle running speed V and a requested drive torque Trdem as two variables are taken along respective two axes, wherein the shifting lines are used for the determination as to whether the shifting action is to be executed in the automatic transmission 50. In the AT-gear-position shifting map, one of the two variables may be the AT output rotational speed No in place of the vehicle running speed V, and the other of the two variables may be any one of a requested drive force Frdem, the accelerator opening degree θacc and the throttle opening degree θth in place of the requested drive torque Trdem. The above-described shifting lines in the AT-gear-position shifting map consist of shift-up lines (indicated by solid lines in FIG. 8) for determining a shift-up action of the automatic transmission 50, and shift-down lines (indicated by broken lines in FIG. 8) for determining a shift-down action of the automatic transmission 50.

The hybrid control portion 134 has a function serving as an engine control means or portion 136 for controlling the operation of the engine 12 and a function serving as a rotating-machine control means or portion 138 for controlling the operations of the TM rotary electric machine MGM and the TF rotary electric machine MGF through the inverter 22, and executes a hybrid drive control, for example, using the engine 12, TM rotary electric machine MGM and TF rotary electric machine MGF through these control functions.

The hybrid control portion 134 calculates a drive request amount requested to the vehicle 8 by the vehicle driver, by applying the accelerator opening degree θacc and the vehicle running speed V to, for example, a drive request amount map that is a predetermined relationship. The drive request amount is, for example, the requested drive torque Trdem [Nm] that is to be applied to the drive wheels (front and rear wheels 14, 16). The requested drive force Frdem [N] applied to the drive wheels, a requested drive power Prdem [W] applied to the drive wheels or a requested AT output torque applied to the transmission output shaft 54, for example, can be used as the drive request amount, in addition to or in place of the requested drive torque Trdem. From another point of view, the requested drive torque Trdem corresponds to the requested drive power Prdem at a speed value of the vehicle running speed V upon output of a command signal. In calculation of the drive request amount, the TF output rotational speed Nof may be used in place of the vehicle running speed V.

The hybrid control portion 134 outputs the engine control command signal Se, MGM control command signal Smgm and MGF control command signal Smgf for controlling the engine 12, TM rotary electric machine MGM and TF rotary electric machine MGF, respectively, such that the requested drive power Prdem is realized, by taking account of various factors such as a transmission loss, an auxiliary load, the gear ratio γat of the automatic transmission 50 and a maximum chargeable amount Win and a maximum dischargeable amount Wout of the battery 24. The engine control command signal Se is, for example, a command value for realizing a requested engine power Pedem that is a requested value of an engine power Pe for outputting the engine torque Te at a speed value of the engine rotational speed Ne upon output of the engine control command signal Se. The engine power Pe is an output [W] of the engine 12, i.e., a power of the engine 12. The MGM control command signal Smgm is, for example, a command value of a consumed electric power Wcmgm or a generated electric power Wgmgm of the TM rotary electric machine MGM for outputting the MGM torque Tmgm at a speed value of the MGM rotational speed Nmgm upon output of the MGM control command signal Smgm. The MGF control command signal Smgf is, for example, a command value of a consumed electric power Wcmgf or a generated electric power Wgmgf of the TF rotary electric machine MGF for outputting the MGF torque Tmgf at a speed value of the MGF rotational speed Nmgf upon output of the MGF control command signal Smgf.

The maximum chargeable amount Win of the battery 24 is a maximum amount of the electric power that can be charged to the battery 24, and indicates an input limit of the battery 24. The maximum dischargeable amount Wout of the battery 24 is a maximum amount of the electric power that can be discharged from the battery 24, and indicates an output limit of the battery 24. The maximum chargeable and dischargeable amounts Win, Wout are calculated by the electronic control device 130, for example, based on a battery temperature THbat and a charged state value SOC [%] of the battery 24 that corresponds to a stored electric energy amount (charged electric energy amount) of the battery 24. The charged state value SOC of the battery 24 is a value indicative of a charged state of the battery 24 and representing a remaining electric power, and is calculated by the electronic control device 130, for example, based on the charging/discharging electric current Ibat and the voltage Vbat of the battery 24.

The hybrid control portion 134 establishes a BEV driving mode as a driving mode for driving the vehicle 8 when the requested drive power Prdem is in a motor drive region smaller than a predetermined threshold value, and establishes an HEV driving mode as the driving mode when the requested drive power Prdem is in an engine drive region not smaller than the predetermined threshold value. In FIG. 8, one-dot chain line A is a boundary line between the engine drive region and the motor drive region, for switching between the BEV driving mode and the HEV driving mode. A predetermined relationship having the boundary line as indicated by the one-dot chain line A of FIG. 8 is an example of a driving-mode switching map defined by two-dimensional coordinates of variables in the form of the vehicle running speed V and the requested drive torque Trdem. In FIG. 6, each of the modes of the numbers m1, m2 is a BEV running mode, while each of the modes of numbers m3-m6 is an HEV running mode. It is noted that, in FIG. 8, the driving-mode switching map is shown together with the AT-gear-position shifting map, for convenience of the description.

Even when the requested drive power Prdem is in the motor drive region, the hybrid control portion 134 establishes the HEV driving mode, for example, in a case in which the charged state value SOC of the battery 24 becomes less than a predetermined engine-start threshold value or in a case in which the engine 12 needs to be warmed up. From another point of view, the motor drive region disappears in the driving-mode switching map, in the case in which the charged state value SOC becomes less than the engine-start threshold value or in the case in which the engine 12 needs to be warmed up. The engine-start threshold value is a predetermined threshold value for determining that the charged state value SOC reaches a level at which the battery 24 needs to be charged by automatically starting the engine 12.

The drive-state control portion 140 determines one of the modes (see FIG. 6) that is to be established in the transfer 28, based on various factors such as the vehicle running speed V, accelerator opening degree θacc, brake ON signal Bon, shift operation position POSsh, longitudinal acceleration Gx, lateral acceleration Gy, yaw rate Ryaw, steering angle θsw, steering direction Dsw, lock-mode ON signal LOCKon and low-gear ON signal LOWon, and outputs various control command signals required for establishing the determined one of the modes. The various control command signals include the hydraulic command signal Scbf for the TF clutch CF1 and TF brake BF1 and the transfer control command signal Stf for the first and second dog clutches D1, D2.

During the BEV driving mode, the drive-state control portion 140 establishes the low gear position in the differential device 64 by placing the TF brake BF1 and the TF clutch CF1 in the engaged state and the released state, respectively, when the vehicle running speed V is in a relatively low speed range, and establishes the high gear position in the differential device 64 by placing the TF brake BF1 and the TF clutch CF1 in the released state and the engaged state, respectively, when the vehicle running speed V is in a relatively high speed range. That is, during the BEV driving mode, the drive-state control portion 140 establishes the "EV (FR) LOW" mode when the vehicle running speed V is in the relatively low speed range, and establishes "EV (FR) HIGH" mode when the vehicle running speed V is in the relatively high speed range.

In the "H4_TORQUE SPLIT" mode, the drive-state control portion 140 determines a running state of the vehicle 8, based on the output signals of various sensors such as the vehicle speed sensor 98, acceleration sensor 110 and yaw rate sensor 112, and sets a target distribution ratio Rdis that is a target value of a torque distribution ratio Rx, depending on the determined running state of the vehicle 8. The torque distribution ratio Rx is a ratio of the torque, between the first and second output shafts 66, 72, i.e., a ratio between the rear wheel torque Tr and the front wheel torque Tf. The torque distribution ratio Rx may be represented by a rear-wheel-side distribution ratio Xr that is a ratio of the rear wheel torque Tr to a total torque Trf (=Tr+Tf) of the rear and front wheel torques Tr, Tf. Alternatively, the torque distribution ratio Rx may be represented by a front-wheel-side distribution ratio Xf (=1−Xr) that is a ratio of the front wheel torque Tf to the total torque Trf (=Tr+Tf) of the rear and front wheel torques Tr, Tf. The torque distribution ratio Rx corresponds to a power distribution ratio.

The drive-state control portion 140 includes a torque-split control portion 142 configured to execute various control operations when the vehicle 8 in the "H4_TORQUE SPLIT" mode. The torque-split control portion 142 is configured to execute a electric-power generation control for controlling the MGF torque Tmgf that is the electric-power generation torque of the TF rotary electric machine MGF such that the torque distribution ratio Rx becomes a target distribution ratio Rdis that is a target value of the torque distribution ratio Rx, and is configured to control a total torque Tpu1 of the engine 12 and the first rotary electric machine MGM that cooperate with each other to constitute the first power source PU1 such that the requested drive torque Trdem is obtained irrespective of the MGF torque Tmgf. That is, the MGF torque Tmgf and the TF input torque Ttfi are calculated or otherwise obtained such that a ratio between the rear wheel torque Tr represented by the above-described expression (3) and the front wheel torque Tf expressed by the above-described expression (4) becomes the target distribution ratio Rdis and such that the total toque Trf as a sum of the rear wheel torque Tr and the front wheel torque Tf satisfies the requested drive torque Trdem. Then, the total torque Tpu1 of the first power source PU1 is determined depending on, for example, the AT gear position established in the automatic transmission 50, such that the TF input torque Ttfin is obtained. The torque-split control portion 142 outputs, to the inverter 22, the MGF control command signal Smgf for causing the TF rotary electric machine MGF to generate the MGF torque Tmgf as the electric-power generation torque, and outputs, to the engine control device 20 and the inverter 22, the engine control command signal Se and the MGM control command signal Smgm for causing the engine 12 and the TM rotary electric machine MGM of the first power source PU1 to cooperate to generate the total torque Tpu1. In this instance, although the engine 12 and the TM rotary electric machine MGM may be controlled by the hybrid control portion 134, the engine 12 and the TM rotary electric machine MGM may be controlled directly by the torque-split control portion 142 rather than by the hybrid control portion 134. The MGF control command signal Smgf is a command value of the generated electric power Wgmgf of the TF rotary electric machine MGF, which is required to output the MGF torque Tmgf. The front-wheel-side distribution ratio Xf is increased with increase of the MGF torque Tmgf of the TF rotary electric machine MGF, and the rear-wheel-side distribution ratio Xr is reduced with increase of the MGF torque Tmgf of the TF rotary electric machine MGF.

Hereinafter, the MGF torque Tmgf and the generated electric power Wgmgf, by which the torque distribution ratio Rx becomes the target distribution ratio Rdis, will be referred to as a target-distribution establishing MGF torque TDmgf and a target-distribution establishing generated electric power WDgmgf, respectively. Further, the MGM torque Tmgm of the TM rotary electric machine MGM driven with use of the target-distribution establishing generated electric power WDgmgf will be referred to as a target-distribution establishing MGM torque TDmgm, and the consumed electric power Wcmgm for driving the TM rotary electric machine MGM will be referred to as a target-distribution establishing consumed electric power WDcmgm.

In the "H4_LSD" mode, the drive-state control portion 140 outputs, to the hydraulic control unit 60, the hydraulic command signal Scbf for controlling the slipping state of the TF clutch CF1, i.e., the torque capacity of the TF clutch CF1, such that the torque distribution ratio Rx becomes the target distribution ratio Rdis. The front-wheel-side distribution ratio Xf is increased with increase of the torque capacity of the TF clutch CF1, and the rear-wheel-side distribution ratio Xr is reduced with increase of the torque capacity of the TF clutch CF1.

When the differential-lock selection switch 120 is placed into the ON state by the vehicle driver in the "H4_TORQUE SPLIT" mode or the "H4_LSD" mode, the drive-state control portion 140 establishes the "H4_Lock" mode, by switching the second dog clutch D2 from the second state [2] to the third state [3]. When the low-gear selection switch 122 is placed into the ON state by the vehicle driver in the "H4_Lock" mode during stop of the vehicle 8, the drive-state control portion 140 establishes the "L4_Lock" mode, by switching the first dog clutch D1 from the first state [1] to the second state [2].

The target-distribution establishing generated electric power WDgmgf, which is generated by the TF rotary electric machine MGF that is subjected to the electric-power generation control during running of the vehicle 8 in the "H4_TORQUE SPLIT" mode, is normally used to charge the battery 24, and is taken out from the battery 24 depending on a running situation of the vehicle 8 so as to be used for a power driving control in which each of the TM rotary electric machine MGM and the TF rotary electric machine MGF is used as an electric motor. However, where the electric power is transferred via the battery 24, namely, supplied and received via the battery 24, an electric power loss is caused when the battery 24 is charged and discharged. On the other hand, in the present embodiment, the torque-split control portion 142, which is configured to perform various control operation during running of the vehicle 8 in the "H4_TORQUE SPLIT" mode, functionally includes an electric-power-consumption control portion 144 and a charge control portion 146 that are related to processing of the target-distribution establishing generated electric power WDgmgf generated by the TF rotary electric machine MGF in the electric-power generation control, and executes a control routine, i.e., signal processing, as shown in a flow chart of FIG. 9. Each of steps S3, S4, S5, S6 and S7 of the control routine corresponds to function of the electric-power-consumption control portion 144, and step S9 of the control routine corresponds to function of the charge control portion 146.

Figure 9:
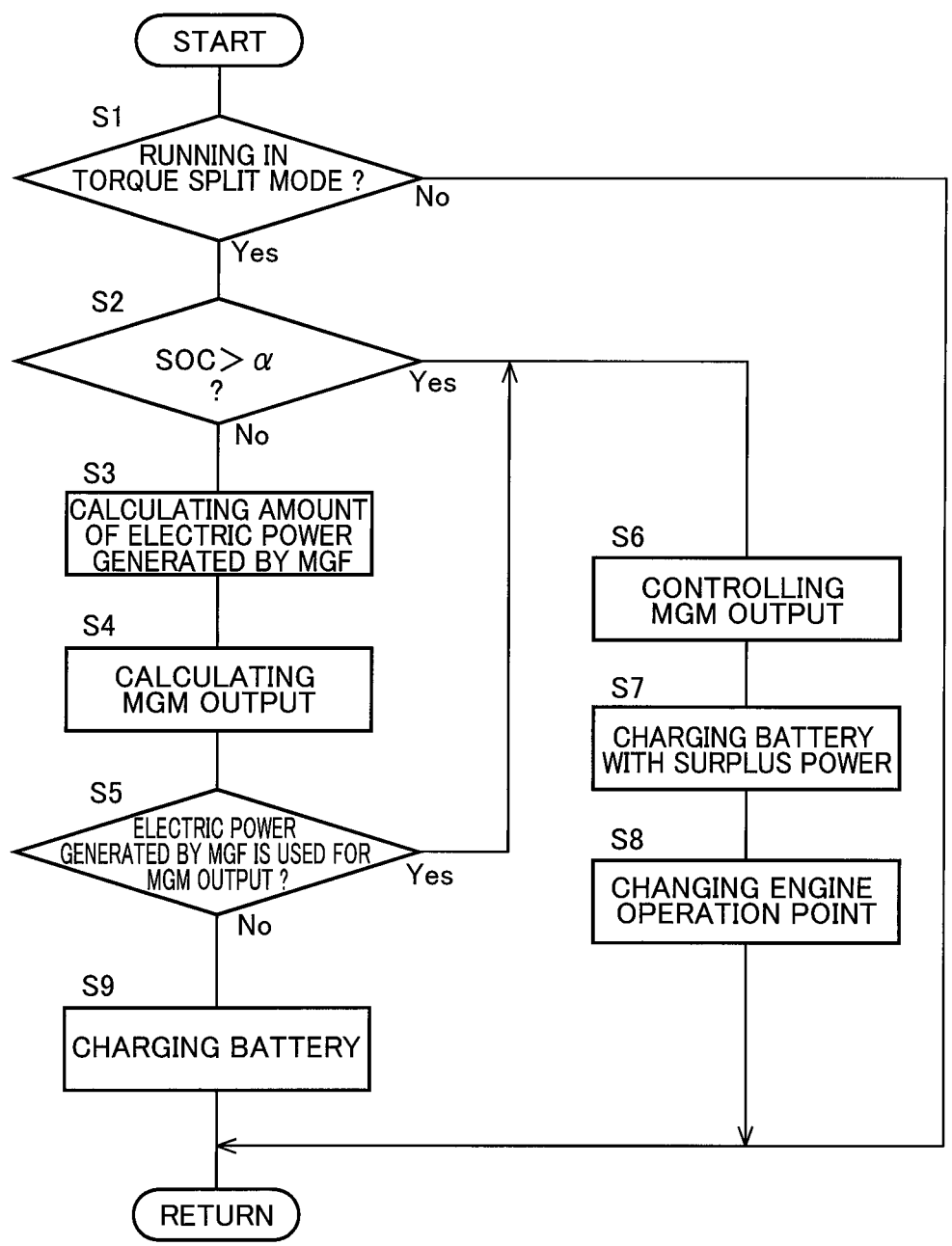
FIG. 9 is a flow chart showing a main part of a control routine that is to be executed by a torque-split control portion of an electronic control device shown in FIG. 1.

The control routine shown in the flow chart of FIG. 9 is initiated with step S1 that is implemented to determine whether the vehicle 8 is running in a torque split mode or not, specifically, running in the "H4_TORQUE SPLIT" mode or not in the present embodiment. When a negative determination is made at step S1, one cycle of execution of the control routine is terminated. When an affirmative determination is made at step S1, step S2 and the subsequent steps are implemented. At step S2, it is determined whether the charged state value SOC of the battery 24 is larger than a predetermined determination value $\alpha$. When an affirmative determination (SOC>$\alpha$) is made at step S2, step S6 and the subsequent steps are implemented. The determination value $\alpha$ is the charged state value SOC of the battery 24 when the battery 24 is fully charged, namely, when it is not appropriate that the battery 24 is more charged. However, the determination value $\alpha$ may be set to a value lower than the fully charged value, because it is better to use the electric power by the TM rotary electric machine MGM, than to once charge the battery 24 with the electric power, in terms of total efficiency, from point of view of an energy efficiency.

At step 6, the target-distribution establishing generated electric power WDgmgf, which is generated by the TF rotary electric machine MGF in the electric-power generation control, is supplied to the TM rotary electric machine MGM without via the battery 24, whereby the TM rotary electric machine MGM is driven. That is, the target-distribution establishing generated electric power WDgmgf, which is obtained by the TF rotary electric machine MGF, is used as the target-distribution establishing consumed electric power WDcmgm of the TM rotary electric machine MGM, so that the MGM torque Tmgm is increased by the target-distribution establishing MGM torque TDmgm that is based on the target-distribution establishing consumed electric power WDcmgm. For example, in the HEV running mode including the "H4_TORQUE SPLIT" mode, where all of the total torque Tpu1 of the first power source PU1 required to obtain the requested drive torque Trdem is to be generated by the engine torque Te, basically, the TM rotary electric machine MGM is driven and rotated by the target-distribution establishing consumed electric power WDcmgm. Further, in the HEV running mode, where the total torque Tpu1 is to be generated by means of a motor assist or the like using both of the engine 12 and the TM rotary electric machine MGM, it is enough to increase the consumed electric power Wcmgm of the TM rotary electric machine MGM by the target-distribution establishing consumed electric power WDcmgm corresponding to the target-distribution establishing generated electric power WDgmgf that is generated by the TF rotary electric machine MGF in the electric-power generation control. Alternatively, the consumed electric power Wcmgm of the TM rotary electric machine MGM by the motor assist may be obtained from the target-distribution establishing generated electric power WDgmgf, so that the electric power taken out of the battery 24 is reduced.

Step S6 is followed by step S7 that is implemented, in a case in which a part of the target-distribution establishing generated electric power WDgmgf generated by the TF rotary electric machine MGF in the electric-power generation control remains as a surplus, the battery 24 is charged with the surplus electric power Wsur. At step S6, in a case in which this step S6 is implemented when the charged state value SOC is larger than the determination value α, the TM rotary electric machine MGM is operated by using the target-distribution establishing generated electric power WDgmgf as much as possible, whereby the surplus electric power Wsur is basically zeroed (Wsur=0) so that the control flow goes to step S8 without charging the batter 24. At step S8, an operation point of the engine 12 is changed such that the total torque Tpu1 of the first power source PU1 is not changed in spite of the increase of the MGM torque Tmgm. The operation point of the engine 12 represents an operation state of the engine 12, and is defined by a combination of the engine rotational speed Ne and the engine torque Te. Since the engine rotational speed Ne is dependent on, for example, the vehicle running speed V and the AT gear position established in the automatic transmission 50, the engine torque Te is reduced by an amount corresponding to the increase (corresponding to the target-distribution establishing MGM torque TDmgm) of the MGM torque Tmgm, wherein the increase is caused by the target-distribution establishing generated electric power WDgmgf.

When a negative determination is made at the above-described step S2, namely, when the charged state value SOC of the battery 24 is not larger than the determination value α, the battery 24 is chargeable so that step S3 and the subsequent steps are implemented. Step S3 is implemented to calculate the target-distribution establishing generated electric power WDgmgf, i.e., an amount of the generated electric power that is generated by the TF rotary electric machine MGF in the electric-power generation control with the target-distribution establishing MGF torque TDmgf by which the torque distribution ratio Rx becomes the target distribution ratio Rdis. Step S3 is followed by step S4 that is implemented to calculate the target-distribution establishing MGM torque TDmgm that is the MGM torque Tmgm in a case in which all of the target-distribution establishing generated electric power WDgmgf is used as the consumed electric power Wcmgm of the TM rotary electric machine MGM. Then, at step S5, it is determined whether or not the MGM torque Tmgm can be increased owing to the target-distribution establishing MGM torque TDmgm such that the operation point of the engine 12 is brought close to a fuel-economy optimum line Lfl that is shown in FIG. 10.

Figure 10:
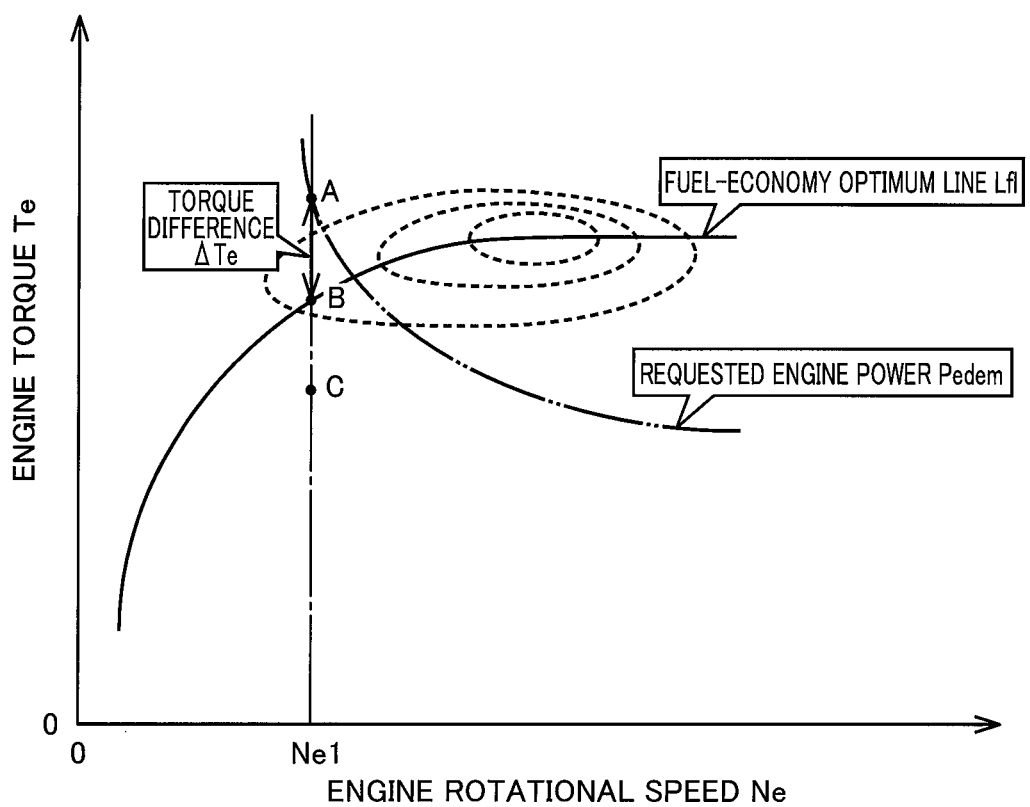
FIG. 10 is a view for explaining a method of determining whether a TM rotary electric machine MGM can be driven by an MGM torque, depending on an operation point of an engine, wherein the determination is made at step S5 of the control routine shown in the flow chart of FIG. 9.

The fuel-economy optimum line Lfl, which is indicated by solid line in FIG. 10, is a predetermined operation curve representing combinations between values of the engine rotational speed Ne and the engine torque Te, which cooperate with each other to maximize the fuel economy of the engine 12. That is, the fuel-economy optimum line Lfl represents a fuel-economy optimum state, and consists of a succession of fuel-economy optimum operation points. FIG. 10 also shows a plurality of equal fuel-economy lines each having an ellipse shape and indicated by broken line, wherein one having a larger ellipse is better than another having a smaller ellipse in fuel economy. FIG. 10 still also shows an equal power line which is indicated by two-dot chain lines and which represents an example of the requested engine power Pedem that realizes the requested drive power Prdem calculated based on, for example, the accelerator opening degree θacc. When the engine rotational speed Ne, which is dependent on, for example, the vehicle running speed V and the AT gear position established in the automatic transmission 50, has a speed value Ne1, an intersection point A shown in FIG. 10 corresponds to the operation point of the engine 12, wherein the intersection point A is an intersection between the equal power line (representing the example of the requested engine power Pedem) and one-dot chain line representing the speed value Ne1 as the engine rotational speed Ne. In a case shown in FIG. 10, an engine torque Tea at the operation point A is larger than an engine torque Teb at an operating point B lying on the fuel-economy optimum line Lfl, it is possible to cause the operation point to be brought close to the fuel-economy optimum line Lfl, by reducing the engine torque Te by the target-distribution establishing MGM torque TDmgm of the TM rotary electric machine MGM. Therefore, in the case shown in FIG. 10, an affirmative determination is made at step S5.

When the affirmative determination is made at step S5, steps S6-S8 are implemented to drive and rotate the TM rotary electric machine MGM by the target-distribution establishing generated electric power WDgmgf and to cause the operation point of the engine 12 to be brought close to the fuel-economy optimum line Lfl. For example, in a case in which a torque difference ΔTe (=Tea−Teb) between the engine torque Tea at the operation point A and the engine torque Teb at the operation point B is coincide with the target-distribution establishing MGM torque TDmgm that is obtained at step S4, all of the target-distribution establishing generated electric power WDgmgf is supplied to the TM rotary electric machine MGM whereby the TM rotary electric machine MGM is driven and rotated to generate the target-distribution establishing MGM torque TDmgm at step S6, and the engine 12 is operated at the operation point B that lies on the fuel-economy optimum line Lfl at step S8. In a case in which the torque difference ΔTe is larger than the target-distribution establishing MGM torque TDmgm, all of the target-distribution establishing generated electric power WDgmgf is supplied to the TM rotary electric machine MGM whereby the TM rotary electric machine MGM is driven and rotated to generate the target-distribution establishing MGM torque TDmgm at step S6, and the engine 12 is operated at an operation point between the point A and the point B shown in FIG. 10, namely, at an operation point of an engine torque Te (=Tea−TDmgm) that is obtained by subtracting the target-distribution establishing MGM torque TDmgm from the engine torque Tea at step S8. In a case in which the torque difference ΔTe is smaller than the target-distribution establishing MGM torque TDmgm, a part of the target-distribution establishing generated electric power WDgmgf is supplied as the consumed electric power Wcmgm to the TM rotary electric machine MGM whereby the TM rotary electric machine MGM is driven and rotated, wherein the part of the target-distribution establishing generated electric power WDgmgf corresponds to an electric power required to cause the TM rotary electric machine MGM to be driven and rotated to generate the MGM torque Tmgm that is equal to the torque difference ΔTe. Then, at step S8, the engine 12 is operated at the operation point B that lies on the fuel-economy optimum line Lfl at step S8. In this case in which the torque difference ΔTe is smaller than the target-distribution establishing MGM torque TDmgm, only the part of the target-distribution establishing generated electric power WDgmgf is consumed as the consumed electric power Wcmgm of the TM rotary electric machine MGM, and the battery 24 is charged with the surplus electric power Wsur (=WDgmgf−Wcmgm).

On the other hand, there could be a case in which the requested engine power Pedem is smaller than the two-dot chain line and the operation point of the engine 12 lies at the point B or point C in FIG. 10, namely, in which the engine torque Te lies on the fuel-economy optimum line Lfl or smaller than the fuel-economy optimum line Lfl. In this case, even if the target-distribution establishing generated electric power WDgmgf is supplied to the TM rotary electric machine MGM and the TM rotary electric machine MGM is driven and rotated, it is not possible to cause the operation point of the engine 12 to be brought close to the fuel-economy optimum line Lfl. Therefore, in this case, a negative determination is made at step S5, and step S9 is implemented to charge the battery 24 with all of the target-distribution establishing generated electric power WDgmgf. It is noted that even in the case in which the operation point of the engine 12 lies at the point B or point C, when the motor assist is performed by the TM rotary electric machine MGM, the consumed electric power Wcmgm of the TM rotary electric machine MGM may be supplied from the target-distribution establishing generated electric power WDgmgf, and the surplus electric power Wsur (=WDgmgf−Wcmgm) may be used to charge the battery 24 at step S9.

In the vehicle driving apparatus 10 described above, the electronic control device 130 includes the torque-split control portion 142 which is configured to execute the electric-power generation control for controlling the target-distribution establishing MGF torque TDmgf of the TF rotary electric machine MGF such that the torque distribution ratio Rx becomes the target distribution ratio Rdis, and which is configured to control the total torque Tpu1 of the first power source PU1 such that the requested drive torque Trdem is obtained irrespective of the target-distribution establishing MGF torque TDmgf, and the torque-split control portion 142 includes the electric-power-consumption control portion 144 configured to execute an electric-power consuming control to supply at least a part of the target-distribution establishing generated electric power WDgmgf obtained by the electric-power generation control, to the TM rotary electric machine MGM without via the battery 24, and to drive the TM rotary electric machine MGM, in a case in which the affirmative determination is made at step S5, namely, in a case in which the operation point of the engine 12 can be brought close to the fuel-economy optimum line Lfl, by driving the TM rotary electric machine MGM by using at least a part of the target-distribution establishing generated electric power WDgmgf obtained by the electric-power generation control. Therefore, as compared with an arrangement in which the target-distribution establishing generated electric power WDgmgf obtained through the electric-power generation control is always used to charge the battery 24, it is possible to reduce the electric power loss due to charge and discharge of the battery 24 and accordingly improve the energy efficiency in the vehicle driving apparatus 10 in its entirety. Further, the TM rotary electric machine MGM is driven with use of the target-distribution establishing generated electric power WDgmgf such that the operation point of the engine 12 is brought close to the fuel-economy optimum line Lfl, whereby the fuel economy of the engine 12 is improved, so that the improved fuel economy of the engine 12 also contributes to the improvement of the energy efficiency in the vehicle driving apparatus 10 in its entirety.

Further, the torque-split control portion 142 includes the charge control portion 146 configured to execute a power-storage charging control to charge the battery 24 with all of the target-distribution establishing generated electric power WDgmgf, and the torque-split control portion 142 is configured to make an engine-operation-state-dependent selection for selecting one of the power-storage charging control by the charge control portion 146 and the electric-power consuming control by the electric-power-consumption control portion 144, depending on the operation point of the engine 12. Owing to this arrangement, the electric-power consuming control is executed by the electric-power-consumption control portion 144 appropriately depending on the operation point of the engine 12, so that the energy efficiency in the vehicle driving apparatus 10 in its entirety can be improved by execution of the electric-power consuming control by the electric-power-consumption control portion 144.

Further, the torque-split control portion 142 determines whether it is possible to cause the operation point of the engine 12 to be brought close to the fuel-economy optimum line Lfl, by supplying at least the part of the target-distribution establishing generated electric power WDgmgf to the TM rotary electric machine MGM and driving the TM rotary electric machine MGM, and the torque-split control portion 142 selects the electric-power consuming control to be executed by the electric-power-consumption control portion 144, when determining that it is possible to cause the operation point of the engine to be brought close to the fuel-economy optimum line Lfl by supplying at least the part of the target-distribution establishing generated electric power WDgmgf to the TM rotary electric machine MGM and driving the TM rotary electric machine MGM. Owing to this arrangement, the electric-power consuming control is executed by the electric-power-consumption control portion 144 appropriately depending on the operation point of the engine 12, so that the energy efficiency in the vehicle driving apparatus 10 in its entirety can be improved by execution of the electric-power consuming control by the electric-power-consumption control portion 144.

When the charged state value SOC of the battery 24 exceeds the determination value α, the torque-split control portion 142 drives the TM rotary electric machine MGM by supplying all of the target-distribution establishing generated electric power WDgmgf to the TM rotary electric machine MGM without via the battery 24, without making the engine-operation-state-dependent selection depending on the operation point of the engine 12. Owing to this arrangement, it is possible to suppress the electric power loss due to the charge and discharge of the battery 24 and full charge of the battery 24.

In a case in which a part of the target-distribution establishing generated electric power WDgmgf remains as a surplus when it is possible to cause the operation point of the engine 12 to be brought close to the fuel-economy optimum line Lfl by supplying at least the part of the target-distribution establishing generated electric power WDgmgf to the TM rotary electric machine MGM and driving the TM rotary electric machine MGM, the electric-power-consumption control portion 144 charges the battery 24 with the part of the target-distribution establishing generated electric power WDgmgf remaining as the surplus. Owing to this arrangement in which the battery 24 is charged with the surplus electric power Wsur, the operation point of the engine 12 is reliably brought close to the fuel-economy optimum line Lfl whereby the energy efficiency in the vehicle driving apparatus 10 in its entirety can be appropriately improved.

While the preferred embodiment of this invention has been described in detail by reference to the drawings, it is to be understood that the invention may be otherwise embodied.

For example, in the above-described embodiment, the differential device 64 may be a transmission configured to establish three or more gear positions, or may be a continuously-variable transmission, too. Further, the differential device 64 may be constituted by a plurality of planetary gear devices, too.

In the above-described embodiment, the transfer 28 is provided with the TF clutch CF1, TF brake BF1, first dog clutch D1 and second dog clutch D2. However, the construction of the transfer 28 may be modified as needed, for example, depending on the kind of the running mode or modes that are to be established. For example, where only the torque split mode is required to be established, the TF clutch CF1, TF brake BF1, first dog clutch D1 and second dog clutch D2 may be all omitted, by connecting the first output shaft 66 to the TF input shaft 62 and connecting the drive gear 70 to the ring gear R. Moreover, a clutch and/or a brake may be additionally provided. For example, where a clutch is provided between the first output shaft 66 and the carrier CA so as to be selectively connect and disconnect between the first output shaft 66 and the carrier CA, it is possible to perform a front-wheel drive (FF) type BEV running in which the vehicle 8 runs with the power of the TF rotary electric machine MGF being transmitted to the front wheels 14 via the second dog clutch D2 and the second output shaft 72.

In the described-above embodiment, the first output shaft 66 may be adapted to serve as an output shaft for outputting the power of the first power source PU1 to the front wheels 14 while the second output shaft 72 may be adapted to serve as an output shaft for outputting the power to the rear wheels 16.

In the above-described embodiment, the power transmission device 18 includes both of the engine connecting/disconnecting clutch K0 and the rotary-electric-machine connecting/disconnecting clutch K2. However, the power transmission device 18 does not necessarily have to include the clutches K0, K2. For example, one of or both of the clutches K0, K2 may be omitted.

In the above-described embodiment, the automatic transmission 50 may be also a known belt-type continuously variable transmission or a synchronous mesh twin shaft parallel axis-type automatic transmission including a known DCT (Dual Clutch Transmission), for example. Further, the automatic transmission 50 may be also an electrically-operated continuously-variable transmission.

In the above-described embodiment, the fluid transmission device may be constituted by the torque converter 48. However, the fluid transmission device may be constituted by other fluid transmission device such as a fluid coupling device without a function of torque boost effect, in place of the torque converter 48. Moreover, the torque converter 48 or other fluid transmission device may be omitted by using a starting clutch or an electrically-operated continuously-variable transmission.

It is to be understood that the embodiment described above is given for illustrative purpose only, and that the present invention may be embodied with various modifications and improvements which may occur to those skilled in the art.

NOMENCLATURE OF ELEMENTS

10: vehicle driving apparatus
12: engine
14: front wheel
16: rear wheel
24: battery (power storage device)
28: transfer (power distribution device)
64: differential device
66: first output shaft
72: second output shaft
130: electronic control device (control device)
142: torque-split control portion
144: electric-power-consumption control portion
146: charge control portion
S: sun gear (first rotary element)
CA: carrier (second rotary element)
R: ring gear (third rotary element)
MGM: TM rotary electric machine (first rotary electric machine)
MGF: TF rotary electric machine (second rotary electric machine)
PU1: first power source (power source)
Tmgf: MGF torque (electric-power generation torque)
SOC: charged state value
α: determination value
A: operation point (operation state)
Lfl: fuel-economy optimum line (fuel-economy optimum state)

What is claimed is:
1. A driving apparatus for a vehicle that includes a pair of front wheels and a pair of rear wheels, the driving apparatus comprising:
a power source including an engine and a first rotary electric machine;
a first output shaft configured to receive a power from the power source, and to output the power to one of the pair of front wheels and the pair of rear wheels;

a second output shaft configured to output the power to the other of the pair of front wheels and the pair of rear wheels;

a power distribution device configured to distribute a part of the power received by the first output shaft, to the second output shaft, and a control device, wherein the power distribution device includes a second rotary electric machine, and a differential device including a first rotary element connected to the second rotary electric machine, a second rotary element connected to the first output shaft and a third rotary element connected to the second output shaft, such that the part of the power received by the first output shaft is distributed to the second output shaft, with a reaction force being applied to the first rotary element owing to an electric-power generation torque of the second rotary electric machine, wherein the control device includes a torque-split control portion which is configured to execute an electric-power generation control for controlling the electric-power generation torque of the second rotary electric machine such that a power distribution ratio between the first and second output shafts becomes a target distribution ratio, and which is configured to control a total torque of the power source including the engine and the first rotary electric machine such that a requested drive torque is obtained irrespective of the electric-power generation torque of the second rotary electric machine, and wherein the torque-split control portion includes an electric-power-consumption control portion configured to execute an electric-power consuming control to supply at least a part of a generated electric power obtained by the electric-power generation control directly to the first rotary electric machine to drive the first rotary electric machine.

2. The driving apparatus according to claim 1, wherein the torque-split control portion includes a charge control portion configured to execute a power-storage charging control to charge a power storage device with all of the generated electric power, and wherein the torque-split control portion is configured to make an engine-operation-state-dependent selection for selecting one of the power-storage charging control by the charge control portion and the electric-power consuming control by the electric-power-consumption control portion, depending on an operation state of the engine.

3. The driving apparatus according to claim 2, wherein the torque-split control portion is configured to determine whether a charged state value of the power storage device exceeds a predetermined a determination value or not, and wherein, when determining that the charged state value of the power storage device exceeds the determination value, the torque-split control portion is configured to drive the first rotary electric machine by supplying all of the generated electric power directly to the first rotary electric machine, without making the engine-operation-state-dependent selection depending on the operation state of the engine.

4. The driving apparatus according to claim 1, wherein, in a case in which a part of the generated electric power remains as a surplus when supplying at least the part of the generated electric power to the first rotary electric machine and driving the first rotary electric machine, the electric-power-consumption control portion is configured to charge a power storage device with the part of the generated electric power remaining as the surplus.

* * * * *